US012613393B2

(12) United States Patent
Zeng

(10) Patent No.: US 12,613,393 B2
(45) Date of Patent: Apr. 28, 2026

(54) LAMP FOR PHOTOGRAPHY AND VIDEO

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 18/863,204

(22) PCT Filed: Nov. 17, 2022

(86) PCT No.: PCT/CN2022/132612
§ 371 (c)(1),
(2) Date: Nov. 5, 2024

(87) PCT Pub. No.: WO2024/040763
PCT Pub. Date: Feb. 29, 2024

(65) Prior Publication Data
US 2025/0224587 A1 Jul. 10, 2025

(30) Foreign Application Priority Data

Aug. 26, 2022 (CN) .......................... 202222265567.4
Aug. 26, 2022 (CN) .......................... 202222266792.X
(Continued)

(51) Int. Cl.
*G02B 7/00* (2021.01)
*G02B 7/02* (2021.01)
*G03B 15/02* (2021.01)

(52) U.S. Cl.
CPC .............. *G02B 7/028* (2013.01); *G03B 15/02* (2013.01); *G03B 2215/056* (2013.01); *G03B 2215/0592* (2013.01)

(58) Field of Classification Search
CPC ........ G02B 7/028; G03B 15/02; G03B 15/03; G03B 15/035
See application file for complete search history.

(56) References Cited

U.S. PATENT DOCUMENTS 10,302,269 B2 * 5/2019 Shibata ................ B60Q 1/0088
2014/0049817 A1 * 2/2014 Yang .................. G02B 21/0076
359/385
(Continued)

FOREIGN PATENT DOCUMENTS

CN 2699335 5/2005
CN 101865431 10/2010
(Continued)

OTHER PUBLICATIONS

WIPO, International Search Report for PCT/CN2022/132612, May 5, 2023.
(Continued)

*Primary Examiner* — Gerald J Sufleta, II
(74) *Attorney, Agent, or Firm* — Hodgson Russ LLP

(57) ABSTRACT

A lamp for photography and video includes a main body and a lamp head provided on the main body, wherein the lamp head includes: a housing, provided with an accommodation cavity inside, an end of the housing is provided with an opening in communication with the accommodation cavity; a light source, provided in the accommodation cavity of the housing; a light effect lens, provided at the opening of the housing and on a same optical axis as the light source; and a transparent heat insulation member, provided between the light source and the light effect lens for blocking heat emitted from the light source to the light effect lens.

18 Claims, 11 Drawing Sheets

(30) Foreign Application Priority Data

| Aug. 26, 2022 | (CN) | 202222270118.9 |
| Aug. 26, 2022 | (CN) | 202222271812.2 |
| Aug. 26, 2022 | (CN) | 202222286738.1 |

(56) References Cited

U.S. PATENT DOCUMENTS

| 2016/0079701 | A1* | 3/2016 | Liao | F21V 23/06 |
| | | | | 439/39 |
| 2018/0051862 | A1 | 2/2018 | Meumann | |
| 2019/0316768 | A1 | 10/2019 | Saito et al. | |
| 2020/0233282 | A1 | 7/2020 | Fahlborg et al. | |
| 2020/0389954 | A1* | 12/2020 | Sinphay | F21V 29/00 |

FOREIGN PATENT DOCUMENTS

| CN | 102252175 | 11/2011 |
| CN | 202812971 | 3/2013 |
| CN | 109739008 | 5/2019 |
| CN | 212302184 | 1/2021 |
| CN | 113075795 | 7/2021 |
| CN | 215117109 | 12/2021 |
| CN | 216848418 | 6/2022 |
| EP | 2249078 | 11/2010 |
| JP | 2003317538 | 11/2003 |
| JP | 4183230 | 11/2008 |
| JP | 2010197583 | 9/2010 |
| KR | 20170115222 | 10/2017 |
| WO | 2022017219 | 1/2022 |

OTHER PUBLICATIONS

EPO, Extended European Search Report for EP Application No. 22956298.8, Nov. 11, 2025.

JPO, Office Action for JP Application No. 2024-577014, Dec. 2, 2025.

IPO, Office Action for GB Application No. 2503483.6, Dec. 8, 2025.

\* cited by examiner

LAMP FOR PHOTOGRAPHY AND VIDEO

CROSS-REFERENCE TO RELATED APPLICATIONS

This application is a national stage entry under 37 U.S.C. § 371 of International Application No. PCT/CN2022/132612, filed on Nov. 17, 2022, which claims priority to Chinese Patent Application No. 202222271812.2, filed on Aug. 26, 2022, Chinese Patent Application No. 202222265567.4, filed on Aug. 26, 2022, Chinese Patent Application No. 202222266792.X, filed on Aug. 26, 2022, Chinese Patent Application No. 202222270118.9, filed on Aug. 26, 2022, and Chinese Patent Application No. 202222286738.1, filed on Aug. 26, 2022. The entire disclosures of the above-identified applications are hereby incorporated herein by reference.

TECHNICAL FIELD

The present application relates to the field of camera technology, and particularly relates to a lamp for photography and video.

BACKGROUND

When using cameras or video cameras for photography or video, it usually needs to utilize a variety of lamps for photography and video, such as, a flash, a video light, fill light, etc. to achieve the intended light effect. With an improvement of requirement of the user for the effect of photography and video, the requirement for performance of the lamp for photography and video is also more and more high.

At present, the lamp for photography and video will generate a large amount of high temperature when working due to continuous flash light or light-emitting for long time, and the light effect lens of the existing lamp for photography and video is made of resin material, with a low melting point. Therefore, the high temperature generated by the light source will cause heat melting of the light effect lens of the lamp for photography and video, which leads to that the lamp for photography and video cannot be used normally, reducing the service life of the light effect lens. Thus, in order to avoid damage to the light effect lens caused by frequent or prolonged work of light source, the existing lamp for photography and video has a greater limitation on the number of continuous flash light or continuous illumination time, which cannot satisfy the user's requirements for high-speed continuous shooting or prolonged work, and greatly reduces the user's experience.

SUMMARY

There is provided a photography and video lamp according to embodiments of the present application. The technical solution is as below:

According to a first aspect of embodiments of the present application, there is provided a photography and video lamp, which includes a main body and a lamp head provided on the main body, the lamp head includes: a housing, provided with an accommodation cavity inside, an end of the housing is provided with an opening in communication with the accommodation cavity: a light source, provided in the accommodation cavity of the housing: a light effect lens, provided at the opening of the housing and on a same optical axis as the light source; and a transparent heat insulation member, provided between the light source and the light effect lens for blocking heat emitted from the light source to the light effect lens.

According to a second aspect of embodiments of the present application, there is provided a lamp for photography and video, including a main body and a lamp head provided on the main body, the lamp head includes:

a housing, provided with an accommodation cavity inside, an end of the housing is provided with an opening in communication with the accommodation cavity;

a light source, provided in the accommodation cavity of the housing;

a light effect accessory, detachably provided at the opening of the housing, wherein the light effect accessory comprises an accessory shell, and a light effect lens and a heat insulation member provided inside the accessory shell;

the light effect lens and the heat insulation member are able to be on a same optical axis as the light source, and the heat insulation member is provided on a side of the light effect lens facing the light source for blocking heat emitted from the light source to the light effect lens.

DETAILED DESCRIPTION OF THE EMBODIMENTS

Figure 1:
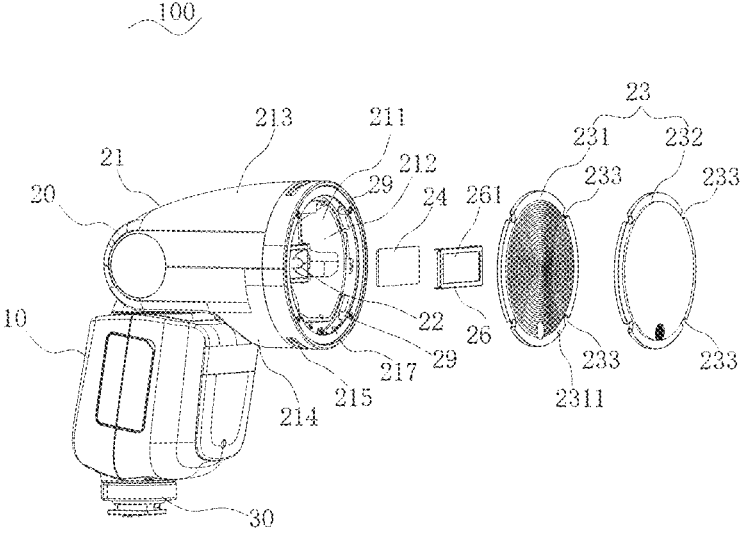
FIG. 1 is a structural view of a first embodiment of the lamp for photography and video of the present application.
Figure 2:
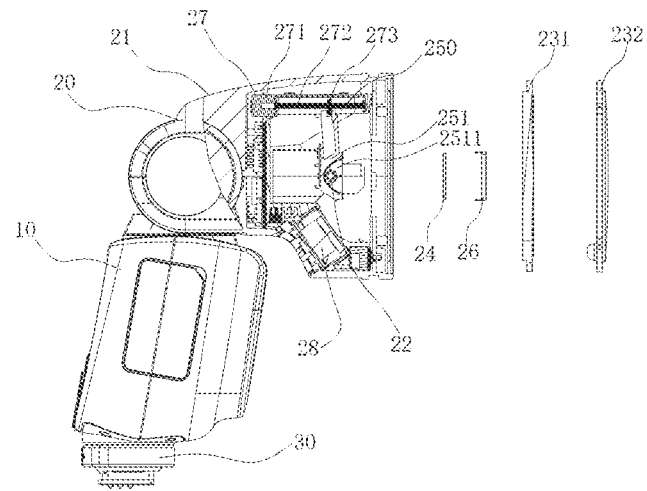
FIG. 2 is an internal structural view of the first embodiment of the lamp for photography and video shown in FIG. 1.
Figure 3:
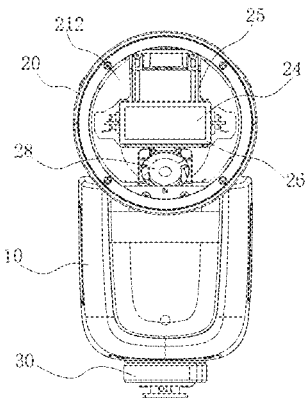
FIG. 3 is an internal structural view of a lamp head of the first embodiment of the lamp for photography and video shown in FIG. 1.
Figure 4:
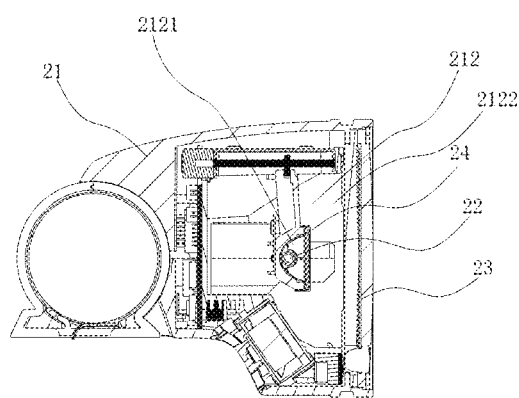
FIG. 4 is a cross-sectional view of the lamp head of the first embodiment of the lamp for photography and video shown in FIG. 1.

Embodiments embodying the features and advantages of the present application will be described in detail in the following description. It is to be understood that the present application can have various variations in different embodiments, none of which is outside the scope of the present application, and that the descriptions and drawings therein are intended to be illustrative in nature and are not intended to limit the present application.

In the description of the present application, it is to be understood that in the embodiments shown in the accompanying drawings, indications of orientation or positional relationships (such as up, down, left, right, forward and backward, etc.) are provided solely for the purpose of facilitating and simplifying the description of the present application, rather than indicating or implying that the device or element referred to must have a particular orientation, be constructed and operated in a particular orientation. These descriptions are appropriate when these elements are in the positions shown in the accompanying drawings. If the description of the position of these elements is changed, the indications of these orientations are changed accordingly.

Furthermore, the terms "first" and "second" are used only for descriptive purposes and are not to be understood as indicating or implying relative importance or implicitly specifying the number of technical features indicated. Thus, a feature defined with "first", "second" may expressly or implicitly include one or more of the described features. In the description of the present application, "more than one" means two or more, unless otherwise expressly and specifically limited.

The structure of the lamp for photography and video will be described in detail in the following with several embodiments in combination with the accompanying drawings.

A first embodiment of the lamp for photography and video.

Referring to FIGS. 1 to 4, an embodiment of the present application provides a lamp 100 for photography and video, which may be a flash light, a photography fill light, a stage lighting light, a live broadcasting light, etc. The lamp 100 for photography and video of this embodiment includes a main body 10 and a lamp head 20 provided on the main body 10. The lamp head 20 includes a housing 21, a light source 22, a light effect lens 23, and a heat insulation member 24.

The housing 21 is provided with an accommodation cavity 212 inside, and an end of the housing 21 is provided with an opening 211 in communication with the accommodation cavity 212. The light source 22 is provided in the accommodation cavity 212 of the housing 21, and the light source 22 may include a flash lamp and a chip on board (COB) lamp. A light effect lens 23 is provided at the opening 211 of the housing 21 and is on the same optical axis as the light source 22. The heat insulation member 24 is transparent, and the heat insulation member 24 is provided between the light source 22 and the light effect lens 23 for blocking heat emitted from the light source 22 to the light effect lens 23.

In the lamp 100 for photography and video of this embodiment, when the heat emitted by the light source 22 reaches the heat insulation member 24, the heat insulation member 24 rapidly absorbs the heat and makes the heat to be uniformly dispersed in the heat insulation member 24 to avoid overheat of a local region of the insulation member 24. Because the heat emitted by the light source 22 is blocked by the heat insulation member 24 and uniformly dispersed to outside, a part of the heat can be conducted to the outside world through the housing 21 and other components, thereby effectively avoiding heat damage to the light effect lens 23 caused by overheat of the local region in the light effect lens 23.

In this embodiment, the heat insulation member 24 separates the accommodation cavity 212 of the housing 21 into a first accommodation region 2121 and a second accommodation region 2122. The light source 22 is provided in the first accommodation region 2121 and the light effect lens 23 is provided in the second accommodation region 2122, and the heat insulation member 24 is configured to block the heat in the first accommodation region 2121 from entering into the second accommodation region 2122.

The inside of the main body 10 of this embodiment is provided with a controller for controlling the relevant functional components and structural components inside the lamp 100 for photography and video. A hot shoe 30 is provided at a bottom of the main body 10, and the main body 10 and the lamp head 20 can be integrally provided on a camera and other video equipments through the hot shoe 30, to establish an electrical signal connection for the lamp 100 for photography and video and the camera and other equipments. The lamp head 20 is rotatably provided on the main body 10, and the lamp head 20 can swing horizontally and up and down around the main body 10 to expand the range of supplemental light of the lamp 100 for photography and video.

In this embodiment, an end of the housing 21 of the lamp head 20 is rotatably connected to the main body 10, and an opening 211 is opened at another end of the lamp head 20. An accommodation cavity 212 is provided inside the lamp head 20, and the opening 211 of the lamp head 20 is in communication with the accommodation cavity 212.

The housing 21 of this embodiment includes an upper housing 213 and a lower housing 214, both the upper housing 213 and the lower housing 214 have cavities formed inside. The upper housing 213 is snapped over the lower housing 214, so that the cavity of the upper housing 213 and the cavity of the lower housing 214 form an accommodation cavity 212 inside the housing 21.

The lamp head 20 further includes a bracket 250 and a reflective cover 251, both the bracket 250 and the reflective cover 251 are provided in the accommodation cavity 212 of the housing 21. In this embodiment, the reflective cover 251 is provided at an end of the bracket 250, a mounting groove 2511 is provided on a surface of the reflective cover 251 facing the opening 211 of the housing 21, and the light source 22 is provided inside the mounting groove 2511.

In this embodiment, an overall outer contour of the reflective cover 251 is C-shaped, the mounting groove 2511 in the reflective cover 251 is curved shape, and the groove opening of the mounting groove 2511 is square. In other examples, the reflective cover 251 and the mounting groove 2511 may also be designed into other shapes, such as circular, L-shaped, etc., according to the use requirements, without being overly limited herein.

The light source 22 is provided in the mounting groove 2511 of the reflective cover 251, and the light emitted from the light source 22 may be emitted from the groove opening of the mounting groove 2511 to the light effect lens 23.

The lamp head 20 also includes a shield 26, the shield 26 is provided at the groove opening of the mounting groove 2511 to be fixed to the mounting groove 2511. The outer contour of the shield 26 is square to fit the groove opening, and the shield 26 is provided with a through square shield opening 261 corresponding to the groove opening of the mounting groove 2511. Through the groove opening of the mounting groove 2511 and the shield opening 261 of the shield 26, the light source 22 can shoot flash light toward the light effect lens 23.

The bracket 250 and the shield 26 of this embodiment may be made of heat-resistant materials, such as ceramics, so that the bracket 250) and the shield 26 can be resistant to high temperature, avoiding the damage to the bracket 250 and the shield 26 caused by a large amount of high temperature generated by frequent flash light of the lamp 100 for photography and video when working, thereby ensuring the stability of the structure of the bracket 250 and the shield 26.

In this embodiment, the lamp head 20 also includes a drive assembly 27, and the drive assembly 27 is provided in the accommodation cavity 212 of the housing 21. The drive assembly 27 includes a drive motor 271, a screw rod 272 connected to the drive motor 271, and a nut 273 movably provided on the screw rod 272.

The drive assembly 27 is provided close to the top of the housing 21 and the screw rod 272 is extended along an axis of the housing 21. The nut 273 is screwed to and sleeved on the screw rod 272, and an end of the bracket 250 away from the reflective cover 251 is fixed to the nut 273. An end of the screw rod 272 is connected to the drive motor 271, and under the action of the drive motor 271, the screw rod 272 can rotate along its own axis, to make the nut 273 to be moved along the axis of the screw rod 272, so that the bracket 250 can move straightly, and the light source 22 can move closer to or farther away from the light effect lens 23 to focus.

The lamp head 20 of this embodiment further includes a fan 28, the fan 28 is provided in the accommodation cavity 212 of the housing 21 and is provided close to the inside of the housing 21. An air inlet 215 is provided at the lower housing 214 of the housing 21 and corresponds to the fan 28. The fan 28 is provided below the reflective cover 251 of the bracket 250, and an air outlet surface of the fan 28 faces the light source 22, the bracket 250, and the light effect lens 23.

When the fan 28 works, wind from the external environment can enter into the accommodation cavity 212 from the air inlet 215. The fan 28 blows air toward the light source 22, the bracket 250, and the light effect lens 23 to generate an airflow with lower temperature. The airflow with the lower temperature can mix with the high temperature generated during the operation of the light source 22 to reduce the temperature inside the housing 21 and prevent the internal components of the housing 21 from softening and deforming caused by the high temperature.

Further, a light effect lens 23 is provided at the opening 211 of the housing 21, which includes a Fresnel lens 231 and a diffusion sheet 232. The diffusion sheet 232 is provided at the opening 211 of the housing 21 and closes the opening 211 of the housing 21. The Fresnel lens 231 is provided on a side of the diffusion sheet 232 facing the light source 22, and is directly opposite to the light source 22. The Fresnel lens 231 cooperates with the diffusion sheet 232 to realize the diffusion of the flash light.

In this embodiment, the lamp head 20 further includes a fixing post 29, the fixing post 29 is fixed to an end surface of the housing 21 provided with the opening 211 and extends to the inside of the housing 21 along an axis of the housing 21. There are a plurality of the fixing posts 29, the plurality of fixing posts 29 are spaced apart along the outer peripheral edge of the opening 211 of the lamp head 20. The Fresnel lens 231 and the diffusion sheet 232 of this embodiment are provided with fixing posts 29 at the outer peripheral edges of the Fresnel lens 231 and the diffusion sheet 232 to make the diffusion sheet 232 and the Fresnel lens 231 to be snap-fixed to the fixing post 29, so that the Fresnel lens 231 and the diffusion sheet 232 are provided at the opening 211 of the housing 21.

Four fixing posts 29 of this embodiment are provided, two of four fixing posts 29 are provided on the upper housing 213 and another two of four fixing posts 29 are provided on the lower housing 214. When assembly, the fixing posts 29 are first mounted on the upper housing 213 and the lower housing 214 before the upper housing 213 and the lower housing 214 are combined. The Fresnel lens 231 and the diffusion sheet 232 can then be snapped onto the fixing posts 29 of the lower housing 214, and then the upper housing 213 can be snapped over the lower housing 214, to complete the assembly of the housing 21 and the light effect lens 23.

In other examples, the fixing post 29 may be a stud, and a screw hole adapted to fit the stud is provided on an end face of the housing 21 at the opening 211. When assembly, the light effect lens 23 can be provided integrally to the housing 21. Specifically, after the upper housing 213 is connected to the lower housing 214, the Fresnel lens 231 and the diffusion sheet 232 are placed on the end surface of the housing 21 at the opening 211, so that the fixing post 29 and the screw hole correspond to each other. Then the stud is correspondingly screwed into the screw hole, so that the nut of the stud presses against the edge of the diffusion sheet 232, to make the light effect lens 23 to be mounted on the housing 21.

In this embodiment, the lamp head 20 further includes a positioning protrusion 217. The positioning protrusion 217 is protruded on the inner sidewall of the housing 21 and is provided close to the opening 211 of the housing 21, and the positioning protrusion 217 is provided on the lower housing 214. In other examples, the positioning protrusion 217 may also be provided on the upper housing 213.

The Fresnel lens 231 of this example is provided with a fixing snap opening 2311 at an edge of the Fresnel lens 231, and the fixing snap opening 2311 of the Fresnel lens 231 can be snap-fit with the positioning protrusion 217. When assembly, the fitting of the fixed snap opening 2311 with the positioning protrusion 217 can rapidly positioning the Fresnel lens 231 on the housing 21, thereby improving the assembly precision and assembly efficiency of the Fresnel lens 231 on the housing 21.

Further, the lamp head 20 further includes a transparent heat insulation member 24. The heat insulation member 24 is provided between the light source 22 and the light effect lens 23 for blocking the heat emitted from the light source 22 to the light effect lens 23.

In this embodiment, the heat insulation member 24 is provided at a groove opening of the mounting groove 2511 of the reflective cover 251 and is provided on a side of the light source 22 facing the light effect lens 23. The heat insulation member 24 is square and adapted to the groove opening of the mounting groove 2511, and the heat insulation member 24 is pressed against the groove opening of the mounting groove 2511 by the shield 26.

The portion of the accommodation cavity 212 enclosed by the heat insulation member 24 and the reflective cover 251 forms a first accommodation region 2121, and the portion of the accommodation cavity 212 other than the first accommodation region 2121 forms a second accommodation region 2122.

The heat insulation member 24 is made of heat insulation material, such as heat insulation glass. The heat insulation member 24 is provided at the groove opening of the mounting groove 2511 of the reflective cover 251, so that the heat insulation member 24 can have a direct heat insulation effect on the light source 22 in the mounting groove 2511, to make the heat insulation member 24 to insulate heat at a starting position where the flash light is emitted, to avoid that the high temperature heat is accumulated in the accommodation cavity 212 of the housing 21, and thus prevent that the high temperature heat produces a heat melting damage to the light effect lens 23, and to ensure that the structural stability of the lamp 100 for photography and video and the user's experience. The heat insulation member 24 is transparent, which makes the flash light of the lamp 100 for photography and video to pass through smoothly, and ensures the supplemental light effect of the lamp 100 for photography and video while insulating the heat.

In some other examples, a plurality of the heat insulation member 24 may be provided, and the plurality of heat insulation members 24 may form multiple protections at the groove opening of the mounting groove 2511 of the reflective cover 251 to further strengthen the heat insulation effect inside the housing 21 and between the light source 22 and the light effect lens 23.

The lamp 100 for photography and video of this embodiment can be provided on top of the camera via the hot shoe 30 at the bottom of the main body 10, to realize the supplemental light or light distribution for the video environment. The lamp 100 for photography and video can also be placed separately without being fixed to the camera, and be connected to the camera via wireless connection for electrical signal connection to realize the supplemental light or light distribution.

When the lamp 100 for photography and video of this embodiment is in use, the light emitted from the light source 22 passes through the heat insulation member 24, the Fresnel lens 231, and the diffusion sheet 232 in turn, and then emits out of the lamp head 20. The heat insulation member 24 is provided on the reflective cover 251 to form a closed first accommodation region 2121 with the reflective cover 251.

The heat emitted from the light source 22 can be blocked in the first accommodation region 2121 by the heat insulation member 24, and due to the fan 28 provided in the second accommodation region 2122, the heat that is overflowed from the first accommodation region 2121 into the second accommodation region 2122 can also be discharged to the outside of the housing 21, thus thereby effectively preventing the heat from damaging the light effect lens 23 provided in the second accommodation region 2122.

Second embodiment of the lamp for photography and video.

Figure 5:
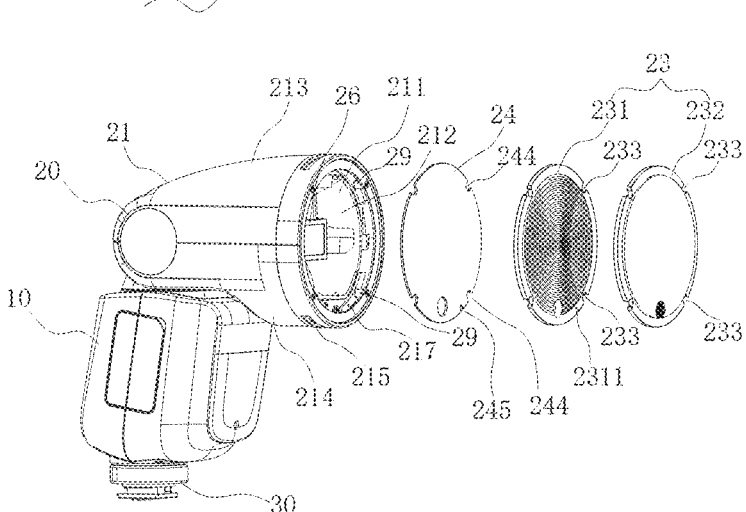
FIG. 5 is a structural view of a second embodiment of the lamp for photography and video of the present application.
Figure 6:
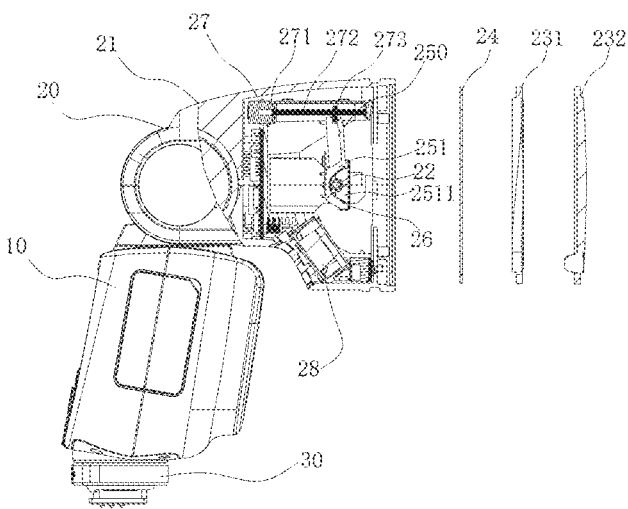
FIG. 6 is an internal structural view of the second embodiment of the lamp for photography and video shown in FIG. 5.
Figure 7:
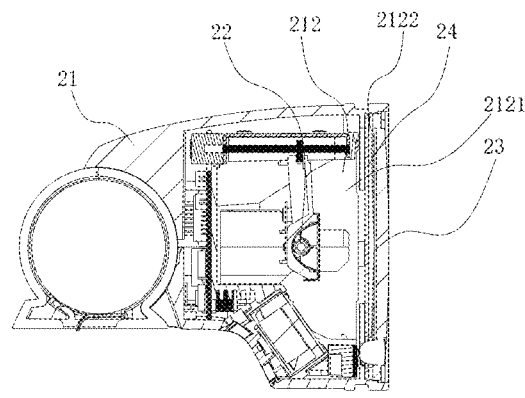
FIG. 7 is a cross-sectional view of the lamp head of the second embodiment of the lamp for photography and video shown in FIG. 5.

Referring to FIGS. 5 to 7, the lamp 100 for photography and video of the second embodiment has substantially the same structure as that of the first embodiment, and the lamp 100 for photography and video of this embodiment also includes a main body 10 and a lamp head 20 provided on the main body 10. The lamp head 20 includes a housing 21, a light source 22, a light effect lens 23, and a heat insulation member 24. The lamp head 20 is rotatably provided on the main body 10. The light source 22 is provided in the accommodation cavity 212 of the housing 21 by the reflective cover 251. The reflective cover 251 is connected to a bracket 250, and the bracket 250) can move straightly by a power assembly to make the light move closer to or further away from the light effect lens 23. The light effect lens 23 includes a Fresnel lens 231 and a diffusion sheet 232 which are provided in the housing 21 in the same way as in the first embodiment, which will not be repeated herein. In addition, the lamp head 20 also includes a fan 28 which is provided in the same way as in the first embodiment for cooling the inside of the lamp head 20.

The difference between the lamp 100 for photography and video of the second embodiment and that of the first embodiment is that the heat insulation member 24 in this embodiment is provided at the opening 211 of the housing 21 and is provided on a side of the light effect lens 23 facing the light source 22. That is, the heat insulation member 24 in this embodiment is provided at the opening 211 of the housing 21 and provided on the side of the Fresnel lens 231 facing the light source 22.

In this embodiment, the heat insulation member 24 separates the accommodation cavity 212 of the housing 21 into the first accommodation region 2121 and the second accommodation region 2122. The light source 22 is provided in the first accommodation region 2121 and the light effect lens 23 is provided in the second accommodation region 2122, and the heat insulation member 24 is configured to block the heat in the first accommodation region 2121 from entering into the second accommodation region 2122.

A side of the accommodation cavity 212 where the heat insulation member 24 faces the light source 22 forms the first accommodation region 2121, and a side of the accommodation cavity 212 where the heat insulation member 24 faces the light effect lens 23 forms the second accommodation region 2122.

In this embodiment, the shape of the heat insulation member 24 is adapted to the shape of the opening 211 of the housing 21. The peripheral edge of the heat insulation member 24 is provided with a plurality of connection openings, and the plurality of connection openings 244 is snap-fit one-in-one with the plurality of fixing posts 29 on the housing 21. The snap-fit of the connection openings 244 with the fixing posts 29 makes the heat insulation member 24 to be fixed to the opening 211 of the housing 21. In other examples, the heat insulation member 24 may also be fixed at the opening 211 of the housing 21 by other means, such as adhesive bonding, hot-melt connection, etc.

The peripheral edge of the heat insulation member 24 of this embodiment is also provided with a positioning snap opening 245, and the positioning snap opening 245 of the heat insulation member 24 can be snap-fit with a positioning protrusion 217 on the inner sidewall of the housing 21. When assembly, through the cooperation of the positioning snap opening 245 and the positioning protrusion 217, the heat insulation member 24 can be positioned on the housing 21 rapidly, thereby ensuring the assembly precision and assembly efficiency of the heat insulation member 24 on the housing 21.

The heat insulation member 24 is transparent, to ensure that the flash light emitted from the lamp 100 for photography and video can smoothly pass through the heat insulation member 24 and be emitted to the light effect lens 23. The heat insulation member 24 is made of heat insulation material, such as a heat insulation glass, etc.

In this embodiment, the heat insulation member 24 is provided at the opening 211 of the housing 21, and the heat insulation member 24 is provided close to the light effect lens 23, so that the heat insulation member 24, on the side of the light effect lens 23 facing the light source 22, can directly insulate the high temperature heat, so that the heat insulation member 24 can provide a comprehensive and direct protection for the light effect lens 23, thereby avoiding or reducing the heat melting damage to the light effect lens 23 caused by the contact of the high temperature heat and the light effect lens 23, so as to ensure the structural stability of the lamp 100 for photography and video and the user's experience.

In some other examples, a plurality of the heat insulation member 24 may be provided, and the plurality of heat insulation members 24 may form multiple protections at the opening 211 of the housing 21 to further strengthen the heat insulation effect between the light source 22 and the light effect lens 23.

In another example, the heat insulation member 24 may be provided in other regions inside the housing 21 in addition to the opening 211 of the housing 21, as long as it is provided between the light source 22 and the light effect lens 23, and an outer sidewall of the heat insulation member 24 is fixed to an inner sidewall of the housing 21.

Figure 8:
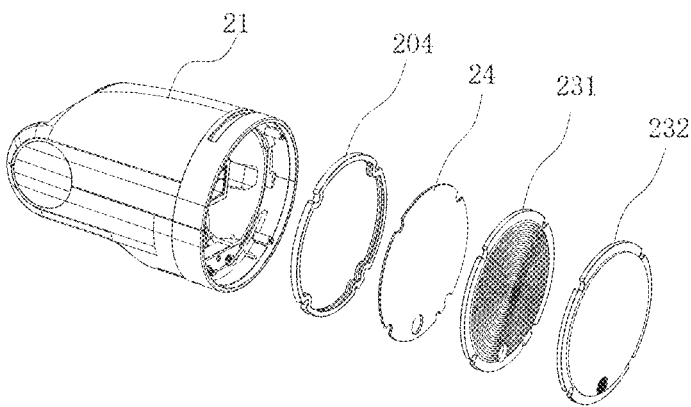
FIG. 8 is an exploded view of an example lamp head of the second embodiment shown in FIG. 5.
Figure 9:
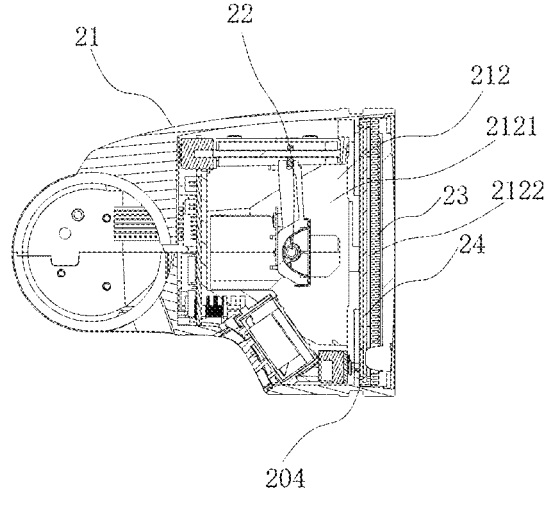
FIG. 9 is a cross-sectional view of the lamp head shown in FIG. 8.

In addition, as shown in FIGS. 8 and 9, in other examples, the lamp head 20 further includes a silicone ring 204. The silicone ring 204 is circular, the shape of the silicone ring 204 is adapted to the outer contour of the heat insulation member 24. The circular silicone ring 204 is provided on the outer peripheral edge of the heat insulation member 24, which are jointly provided at the opening 211 of the housing 21.

The outer periphery of the silicone ring 204 is abutted against the inner sidewall of the housing 21 to transfer heat from the heat insulation member 24 to the housing 21. In this example, the housing 21 may be made of metal to better transfer the heat for heat dissipation, and a metal heat dissipation member may also be provided at where the housing 21 is connected to the silicone ring 204 to dissipate the heat from the heat insulation member 24.

Figure 10:
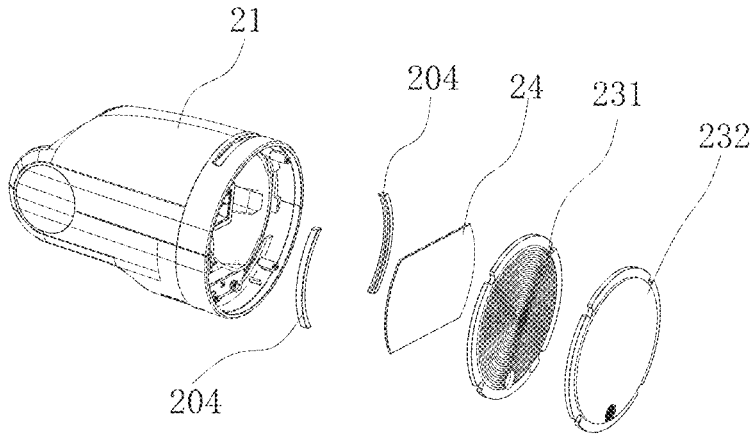
FIG. 10 is an exploded view of another example lamp head of the second embodiment shown in FIG. 5.
Figure 11:
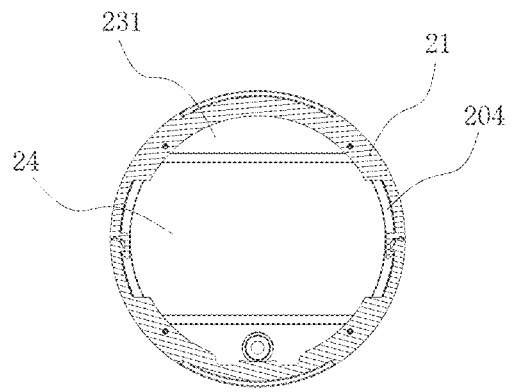
FIG. 11 is a cross-sectional view of the lamp head shown in FIG. 10.

As shown in FIGS. 10 and 11, in another example of this embodiment, the heat insulation member 24 may be provided to partially shield the Fresnel lens 231 of the light effect lens 23, and the center of the heat insulation member 24 corresponds to the center of the Fresnel lens 231.

Specifically, the whole heat insulation member 24 of this example is elongated, and its outer contour includes a pair of opposite flat edges and a pair of opposite curved edges.

In this example, the lamp head 20 includes a pair of opposite silicone rings 204, which are of strip structure. The silicone ring 204 of the strip structure is curved shape and is adapted to the curved edge of the heat insulation member 24. The two silicone rings 204 are provided on two curved edges of the heat insulation member 24, respectively.

The two silicone rings 204 together with the heat insulation member 24 are provided at the opening 211 of the housing 21, and the two silicone rings 204 are abutted against the inner sidewall of the housing 21. There are gaps between the inner sidewall of the housing 21 and the flat edge regions on two sides of the heat insulation member 24.

The heat insulation member 24 shields the center of the Fresnel lens 231, which not only can realize that the heat insulation member 24 can block the heat from affecting the main part of the Fresnel lens 231, avoiding the Fresnel lens 231 from being damage by the heat, but also can make the effective transmission of the light from the light source 22. The heat insulation member 24 can absorb the high temperature heat emitted by the light source 22, and can transfer the high temperature heat to the housing 21 through the strip-structured silicone rings 204 on both sides, realizing the conduction of the heat on the heat insulation member 24 by the housing 21, to avoid that the high temperature heat is accumulated on the heat insulation member 24 and affects the light effect lens 23 on the back side of the heat insulation member 24, to efficiently prevent heat melting damage to the light effect lens 23.

It is to be understood that, in addition to the elongated heat insulation member 24 shown in this example, the heat insulation member 24 may be regular shape such as a semicircle, a fan, a triangle, or other irregular shapes, as long as it can shield the central main part of the Fresnel lens 231. Correspondingly, the silicone ring 204 can be provided into different structures corresponding to the heat insulation member 24, as long as the heat insulation member 24 can transfers heat to the housing 21 through the silicone ring 204.

When the lamp 100 for photography and video of this embodiment is in use, the light emitted from the light source 22 passes through the heat insulation member 24, the Fresnel lens 231, and the diffusion sheet 232 in turn, and then emits out of the lamp head 20. The side of the accommodation cavity 212 where the heat insulation member 24 faces the light source 22 forms the first accommodation region 2121, the heat emitted by the light source 22 can be blocked in the first accommodation region 2121 by the heat insulation member 24, and the fan 28 provided in the first accommodation region 2121 can directly discharge the heat from the first accommodation region 2121 to the outside of the housing 21, to avoid the heat in the first accommodation region 2121 from overflowing to the second accommodation region 2122, thereby preventing the heat from damaging the light effect lens 23 provided in the second accommodation region 2122.

A third embodiment of the lamp for photography and video.

Figure 12:
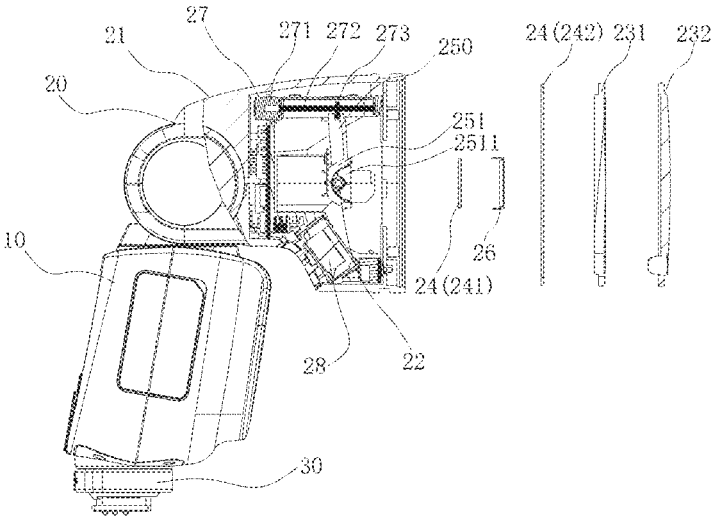
FIG. 12 is an internal structural view of a third embodiment of the lamp for photography and video of the present application.
Figure 13:
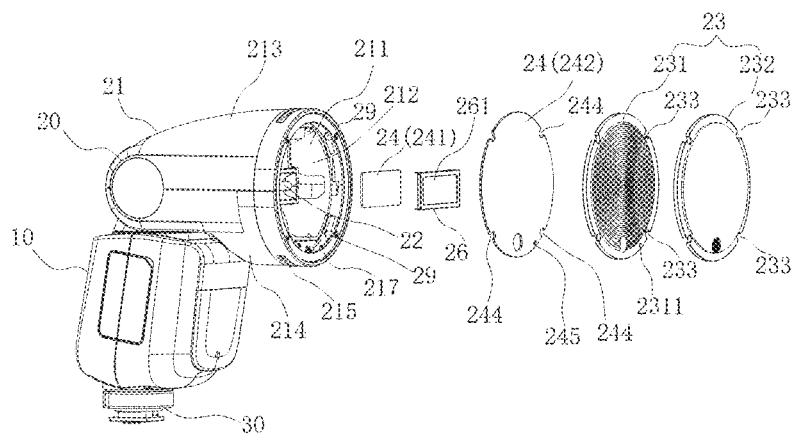
FIG. 13 is an internal structural view of the third embodiment of the lamp for photography and video shown in FIG. 8.

Referring to FIGS. 12 and 13, the lamp 100 for photography and video of the third embodiment has substantially the same structure as that of the first embodiment and the second embodiment, and the lamp 100 for photography and video of this embodiment also includes a main body 10 and a lamp head 20 provided on the main body 10, and the lamp head 20 includes a housing 21, a light source 22, a light effect lens 23, and a heat insulation member 24. The lamp head 20 is rotatably provided on the main body 10, and the light source 22 is provided in the accommodation cavity 212 of the housing 21 via the reflective cover 251. The reflective cover 251 is connected to a bracket 250), and the bracket 250 can move straightly by a power assembly, so that the light can move closer to or further away from the light effect lens 23. The light effect lens 23 includes a Fresnel lens 231 and a diffusion sheet 232 which are provided in the housing 21 in the same way as in the first embodiment and the second embodiment, which will not be discussed herein. In addition, the lamp head 20 also includes a fan 28, which is provided in the same way as in the first embodiment and the second embodiment for cooling the inside of the lamp head 20.

The difference between the lamp 100 for photography and video of the third embodiment and that of the first embodiment and the second embodiment is that the heat insulation member 24 of this embodiment includes a first heat insulation member 241 and a second heat insulation member 242. The first heat insulation member 241 is provided at a groove opening of the mounting groove 2511 of the reflective cover 251 and is provided on a side of the light source 22 facing the light effect lens 23. The second heat insulation member 242 is provided at the opening 211 of the housing 21 and provided between the light source 22 and the light effect lens 23.

Specifically, the structure and connection method of the first heat insulation member 241 in this embodiment is basically the same as that of the heat insulation member 24 in the first embodiment, and the structure and connection method of the second heat insulation member 242 in this embodiment is basically the same as that of the heat insulation member 24 in the second embodiment, which will be not repeated herein. The first heat insulation member 241 and the second heat insulation member 242 are both made of heat insulation materials, such as heat insulation glass.

The first heat insulation member 241 is provided at the groove opening of the mounting groove 2511 of the reflective cover 251, which can directly produce a heat insulation effect on the light source 22 in the mounting groove 2511, to block heat at the starting position where the flash light is emitted, to avoid that the high temperature heat is accumulated in the accommodation cavity 212 of the housing 21, and thus prevent that the high temperature heat produces heat melting damage to the light effect lens 23. The second insulation member 242 is provided at the opening 211 of the housing 21, such that it, on the side of the light effect lens 23 facing the light source 22, can directly insulate the high temperature heat, to make the heat insulation member 24 provide comprehensive and direct protection for the light effect lens 23, thereby avoiding or reducing the heat melting damage to the light effect lens 23 caused by the contact of the high temperature heat and the light effect lens 23. The cooperation of the first heat insulation member 241 and the second heat insulation member 242 effectively strengthens the heat insulation effect inside the lamp head 20 and between the light source 22 and the light effect lens 23.

In some other examples, a plurality of the first heat insulation members 241 and a plurality of the second heat insulation member 242 may be provided to form multiple protections at both the groove opening of the reflective cover 251 and the opening 211 of the housing 21 to further strengthen the heat insulation effect between the light source 22 and the light effect lens 23.

Figure 14:
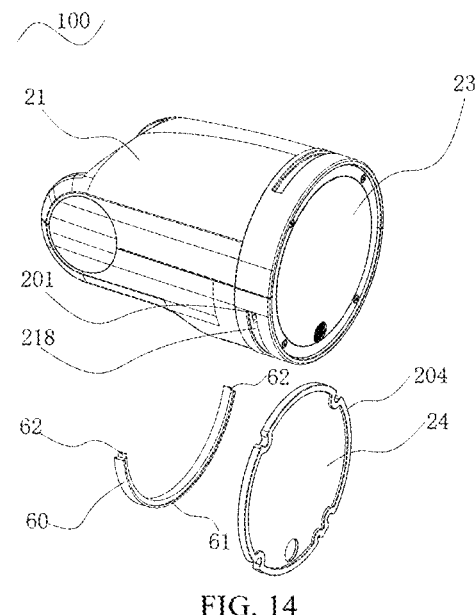
FIG. 14 is an internal structural view of the first embodiment of the lamp for photography and video of the present application.
Figure 15:
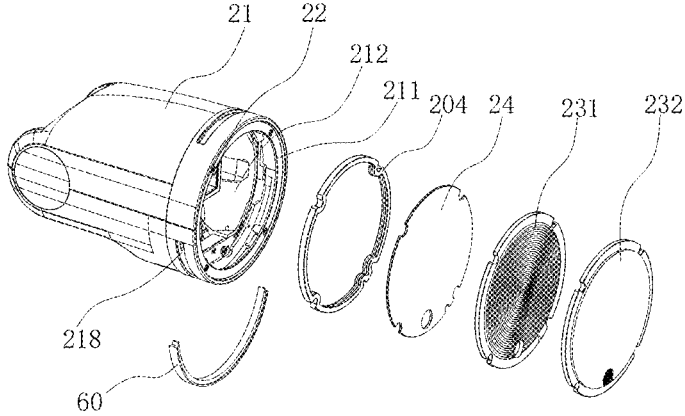
FIG. 15 is an exploded view of the lamp for photography and video shown in FIG. 14.
Figure 16:
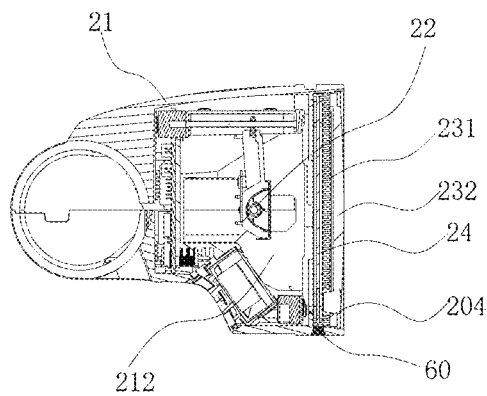
FIG. 16 is a cross-sectional view of the lamp for photography and video shown in FIG. 14.

Referring to FIGS. 14 to 16, an embodiment of the present application provides a lamp 100 for photography and video, which may be a flash light, a photography fill light, a stage lighting light, a live broadcasting light, etc. The lamp 100 for photography and video of this embodiment includes a housing 21, a light source 22, a light effect lens 23, and a heat insulation member 24.

The inside of the housing 21 is provided with an accommodation cavity 212, and an end of the housing 21 is provided with an opening 211 in communication with the accommodation cavity 212. A socket 218 in communication with the accommodation cavity 212 is provided on a sidewall of the housing 21. A light source 22 is provided in the accommodation cavity 212 of the housing 21, and the light source 22 may include a flash lamp and a COB lamp. A light effect lens 23 is provided at the opening 211 of the housing 21 and is on the same optical axis as the light source 22. The heat insulation member 24 is transparent, and the heat insulation member 24 is socketed in the accommodation cavity 212 via the socket 218. The heat insulation member 24 is provided between the light source 22 and the light effect lens 23 for blocking the heat emitted from the light source 22 to the light effect lens 23.

In this embodiment, the heat insulation member 24 is socketed into the accommodation cavity 212 of the housing 21 via the socket 218 in the housing 21, and the heat insulation member 24 is made of heat insulation material, such as a heat insulation glass. When the heat emitted by the light source 22 reaches the heat insulation member 24, the heat insulation member 24 can absorb the heat rapidly and make the heat uniformly dispersed in the heat insulation member 24 to avoid overheat of a local region of the heat insulation member 24. Because the heat emitted by the light source 22 is blocked by the heat insulation member 24 and uniformly distributed to outside, a part of the heat can be conducted to the outside world through the lamp housing and other components, thereby effectively preventing heat damage to the light effect lens 23 caused by overheat of a local region of the light effect lens 23.

The lamp 100 for photography and video of this embodiment further includes a silicone ring 204, the shape of the silicone ring 204 is adapted to the outer contour of the heat insulation member 24, the silicone ring 204 is provided on the outer periphery of the heat insulation member 24, which are jointly provided in the inside of the housing 21. An outer peripheral sidewall of the silicone ring 204 is abutted against the inner sidewall of the housing 21.

The outer periphery of the silicone ring 204 is abutted against the inner sidewall of the housing 21, and the heat insulation member 24 can transfer the high temperature heat to the housing 21 by the silicone ring 204. In this embodiment, the housing 21 can be made of metal or a metal conductive member can be provided between the housing 21 and the silicone ring 204 to better transfer the heat for heat dissipation.

In this embodiment, the heat insulation member 24 and the silicone ring 204 are jointly provided in the accommodation cavity 212 of the housing 21, which can be socketed into the inside of the housing 21 via the socket 218. The whole of the heat insulation member 24 and the silicone ring 204 is detachably, which simplifies the installation of the heat insulation member 24 and the silicone ring 204 on the housing 21, facilitates the maintenance and replacement of the heat insulation member 24 and the silicone ring 204, and helps to prolong the service life of the lamp 100 for photography and video.

In addition, in addition to that the heat insulation member 24 and the silicone ring 204 can be socketed via the socket 218 on the housing 21, the lamp 100 for photography and video of this embodiment can be replaced or added with other functional lenses according to the needs of the use, to increase the light effect function of the lamp 100 for photography and video, and to expand the scope of use of the lamp 100 for photography and video.

Further, the lamp 100 for photography and video of this embodiment also includes a cover body 60, which is configured to open or close the socket 218. A cross-section of the housing 21 is circular, the socket 218 on the housing 21 is curved shape, and the cover body 60 is adapted to the shape of the socket 218 and is curved shape.

In this embodiment, the cover body 60 is detachably provided on the housing 21. When the socket 218 is in an open state, the cover body 60 is detached from the housing 21. Specifically, the cover body 60 of this embodiment includes a cover main body 61 and an adapter portion 62. The cover main body 61 is curved shape, and the adapter portion 62 is provided with two portions, which are provided at two ends of the cover main body 61, respectively, the adapter portion 62 is protruded on an end face of the cover main body 61.

The portions of the housing 21 close to two ends of the socket 218 are provided with connection groove openings 201, and the adapter portions 62 are snapped in the connection groove openings 201 to make the cover body 60 to close the socket 218. When it is necessary to open the socket 218, the adapter portions 62 are un-snap-fit with the connection groove openings 201, so that the cover body 60 is detached from the housing 21 to open the socket 218.

Since the cover body 60 opens the socket 218, the heat insulation member 24 together with the silicone ring 204 can be socketed in the accommodation cavity 212 of the housing 21 via the socket 218. Then the cover body 60 closes the socket 218, the cover body 60 can effectively prevent the heat insulation member 24 and the silicone ring 204 from detaching from the housing 21, ensuring that the heat insulation member 24 can smoothly perform heat insulation, and ensuring the overall structural stability of the lamp 100 for photography and video.

In other examples of this embodiment, the cover body 60 may also be detachably connected to the housing 21 by magnetic accessory.

Specifically, the lamp 100 for photography and video further includes a magnetic member and a magnetic suction member. The magnetic member is provided on the cover body 60, and the magnetic member is provided at the socket 218 of the housing 21. The magnetic suction member is magnetically fixed to the magnetic member, so that the cover body 60 can close the socket 218, and when it is necessary to open the socket 218, it is sufficient to release magnetic fixation of the magnetic suction member and the magnetic member.

In addition to the snap-fit or magnetic fixation of the cover body 60 and the housing 21 shown above, the cover body 60 and the housing 21 may be detachably connected in other ways, such as the cover body 60 is connected to the housing 21 by screws or pins, or the cover body 60 is fixed to the socket 218 by a snap-fit or a snap-hook structure.

Furthermore, in other examples, an end of the cover body 60 can be rotatably connected to the housing 21. If an end of the cover body 60 is rotatably connected to the housing 21 by a pivot, another end of the cover body 60 can be snap-fit or magnetically fixed to the housing 21. When the cover body 60 is rotated relative to the housing 21 to be away from the socket 218, the cover body 60 can open the socket 218. When the cover body 60 is rotated relative to the housing 21 to be close to the socket 218, the cover body 60 can close the socket 218. The end of the cover body 60 is rotatably connected to the housing 21, which is able to efficiently prevent loss of the cover body 60.

In this embodiment, when the cover body 60 closes the socket 218, the inner sidewall of the cover body 60 is abutted against the outer sidewall of the silicone ring 204. The cover body 60 may be provided as a metal member to effectively transfer heat from the heat insulation member 24, thereby avoiding accumulation of heat.

The light effect lens 23 of this embodiment includes a Fresnel lens 231 and a diffusion sheet 232. The diffusion sheet 232 is configured to close the opening 211 of the housing 21, and the Fresnel lens 231 is provided on the side of the diffusion sheet 232 facing the light source 22. The Fresnel lens 231 is directly opposite to the light source 22 of the lamp 100 for photography and video, and is cooperated with the diffusion sheet 232 to realize the diffusion of light from the light source 22.

In this embodiment, the socket 218 is provided close to the opening 211 of the housing 21, and the heat insulation member 24 socketed into the accommodation cavity 212 via the socket 218 is provided close to the light effect lens 23 and provided on the side of the Fresnel lens 231 facing the light source 22. The heat insulation member 24 is transparent, and provided to ensure that light from the light source 22 can smoothly pass through the heat insulation member 24 and be emitted to the light effect lens 23.

When the light source 22 of the lamp 100 for photography and video is in use, the heat emitted by the light source 22 of the lamp 100 for photography and video reaches the heat insulation member 24, the heat insulation member 24 can rapidly absorb the heat and make the heat to be uniformly dispersed in the heat insulation member 24 to avoid overheat of a local region of the heat insulation member 24. The heat emitted by the light source 22 is blocked by the heat insulation member 24 and uniformly emitted to outside, and a part of the heat can be conducted to the outside world through the housing 21 and other components of the lamp 100 for photography and video, thereby effectively preventing the heat from accumulation on the Fresnel lens 231, and avoiding heat damage to the light effect lens 23 caused by overheat of a local region of the light effect lens 23.

In some examples of this embodiment, a plurality of heat insulation members 2 may be provided, and the plurality of heat insulation members 24 form multiple protections on the side of the Fresnel lens 231 facing the light source 22, avoiding as much as possible the overflow of high temperature heat to the Fresnel lens 231, to effectively improve the heat insulation effect of the heat insulation member 24 between the light source 22 and the light effect lens 23.

The present application also provides a lamp 100 for photography and video, which includes a main body 10 and a lamp head 20 provided on the main body 10. The lamp head 20 includes a housing 21, a light source 22, and a light effect accessory 40.

The housing 21 is provided with an accommodation cavity 212 inside the housing 21, and an end of the housing 21 is provided with an opening 211 in communication with the accommodation cavity 212. The light source 22 is provided in the accommodation cavity 212 of the housing 21. A light effect accessory 40 is detachably provided at the opening 211 of the housing 21. The light effect accessory 40 includes an accessory shell 41, and a light effect lens 23 and a heat insulation member 24 provided inside the accessory shell 41. The light effect lens 23 and the heat insulation member 24 can be on the same optical axis as the light source 22. The heat insulation member 24 is provided on a side of the light effect lens 23 facing the light source 22 for blocking heat emitted from the light source 22 to the light effect lens 23.

Figure 17:
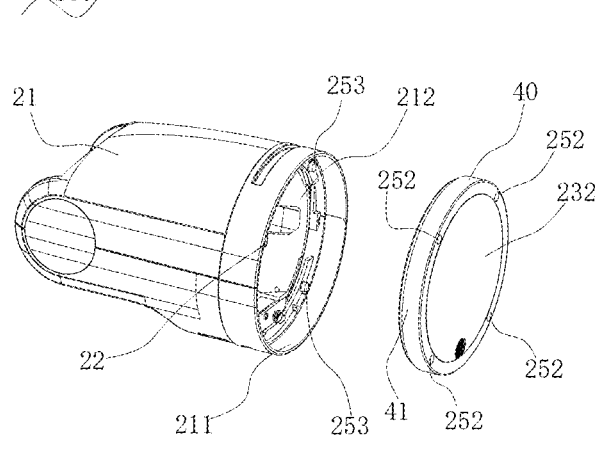
FIG. 17 is a structural view of an embodiment of the lamp for photography and video of the present application.
Figure 18:
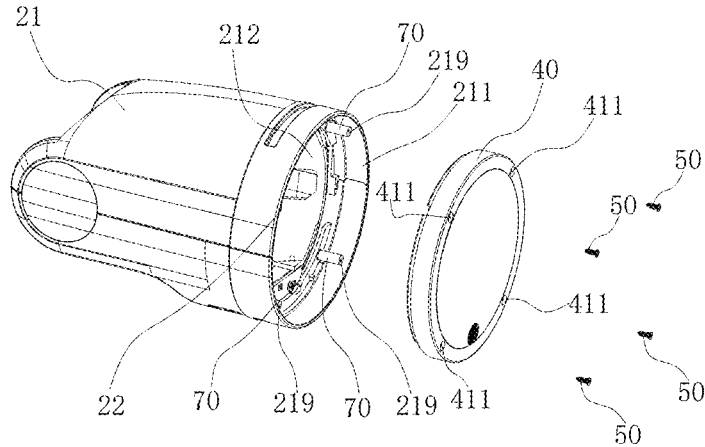
FIG. 18 is an exploded view of a light effect accessory in the lamp for photography and video shown in FIG. 17.
Figure 19:
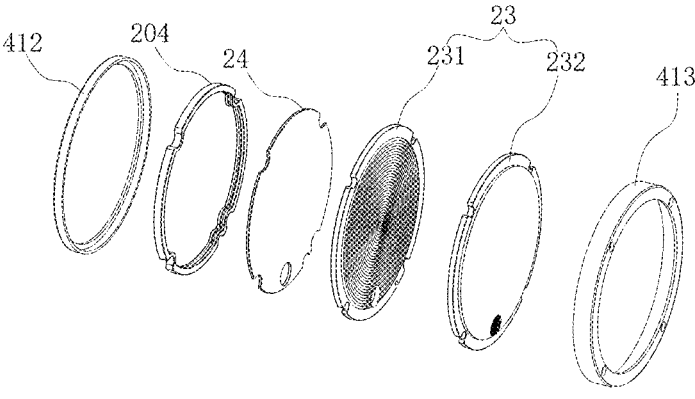
FIG. 19 is a cross-sectional view of the light effect accessory in the lamp for photography and video shown in FIG. 17.

Referring to FIGS. 17 to 19, an embodiment of the present application provides a lamp 100 for photography and video, which may be a flash light, a photography fill light, a stage lighting light, a live broadcasting light, etc. The lamp 100 for photography and video of this embodiment includes a housing 21, a light source 22, and a light effect accessory 40.

The inside of the housing 21 is provided with an accommodation cavity 212, and an end of the housing 21 is provided with an opening 211 in communication with the accommodation cavity 212. The light source 22 is provided in the accommodation cavity 212 of the housing 21, and the light source 22 may include a flash lamp and a COB lamp. A light effect accessory 40 is provided at the opening 211 of the housing 21, and the light effect accessory 40 includes an accessory shell 41, and a light effect lens 23 and a heat insulation member 24 provided inside the accessory shell 41. The light effect lens 23 is on the same optical axis as the light source 22. The heat insulation member 24 is transparent, and provided on the side of the light effect lens 23 facing the light source 22 for blocking the heat emitted from the light source 22 to the light effect lens 23.

In this embodiment, the light effect accessory 40 is detachably provided at the opening 211 of the housing 21. Specifically, the light effect accessory 40 further includes a light effect magnetic suction member 252 provided on the accessory shell 41. A plurality of the light effect magnetic suction member 252 may be provided, and the plurality of light effect magnetic suction members 252 are spaced apart on the accessory shell 41.

The lamp 100 for photography and video of this embodiment further includes a light effect magnetic member 253, the light effect magnetic member 253 is provided on an inner sidewall of the housing 21 at the opening 211. A plurality of the light effect magnetic member 253 may be provided, the plurality of light effect magnetic members 253 are spaced apart on the inner sidewall of the housing 21. The light effect magnetic member 253 is a columnar structure, whose extension direction is coincident with the axis of the housing 21, and an outer end surface of the light effect magnetic member 253 is provided towards the opening 211 of the housing 21.

When the light effect accessory 40 is placed at the opening 211 of the housing 21, the light effect magnetic suction member 252 of the light effect accessory 40 can be magnetically fixed with the light effect magnetic member 253 at the opening 211 of the housing 21, and the plurality of light effect magnetic members 252 are magnetically suctioned with the plurality of light effect magnetic members 253 one-in-one, respectively; to make the light effect accessory 40 to be detachably provided at the opening 211 of the housing 21.

The light effect accessory 40 as a whole is detachably provided in the housing 21, and the light effect accessory 40 can realizes the replacement of the heat insulation member 24 and the light effect lens 23 simultaneously, which can simplify the assembly of the various components in the lamp for photography and video and improve the installation and maintenance efficiency of the heat insulation member 24 and the light effect lens 23 as a whole. The user can flexibly select different types of light effect accessories 40 to be assembled on the housing 21 according to the specific needs of use, which can effectively improve the convenience and flexibility of the user using the lamp for photography and video.

Figure 20:
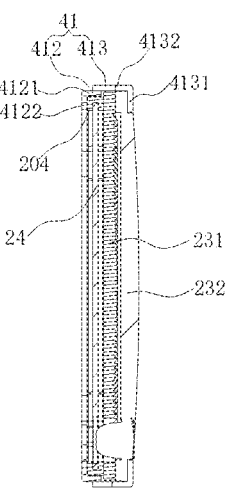
FIG. 20 is a structural view of another embodiment of the lamp for photography and video of the present application.

In addition to the detachable connection between the light effect accessory 40 and the housing 21 by magnetic fixation as shown in this embodiment, as shown in FIG. 20, the light effect accessory 40 can also be detachably connected to the opening 211 of the housing 21 by a fastener 50.

Specifically, the accessory shell 41 is provided with a mounting hole 411. A plurality of the mounting holes 411 may be provided, and the plurality of mounting holes 411 are spaced apart on the accessory shell 41.

The lamp 100 for photography and video further includes a connection post 70, the connection post 70 is provided on an inner sidewall of the housing 21 at the opening 211. The connection post 70 is extended along an axis of the housing 21, and a connection hole 219 is formed on an end surface of the connection post 70 facing the opening 211 of the housing 21. A plurality of the connection post 70 may be provided, and the plurality of connection posts 70 are provided spaced apart on the inner sidewall of the housing 21.

When the light effect accessory 40 is placed at the opening 211 of the housing 21, the mounting holes 411 on the light effect accessory 40 correspond one-in-one to the connection holes 219 of the connection posts 70. A fastener 50 is passed through the mounting hole 411 and the connection hole 219, such that the light effect accessory 40 is detachably fixed to the opening 211 of the housing 21. The fastener 50 may be a screw or a pin, etc., which is not overly limited herein.

Further, in combination with FIGS. 18 and 19, the accessory shell 41 of this embodiment as whole is circular, and the accessory shell 41 includes a base 412 and a top cover 413, and the base 412 and the top cover 413 are both circular. Compared to the top cover 413, the base 412 of the light effect accessory 40 is provided closer to the light source 22.

The top cover 413 includes a cover body portion 4131 and a connection portion 4132, and the connection portion 4132 is bent and connected to a peripheral edge of the cover body portion 4131. The base 412 includes a fixing portion 4121 and a stopping portion 4122, the stopping portion 4122 is bent and connected to the peripheral edge of the fixing portion 4121. A connection portion 4132 of the top cover 413 is socketed and fixed to the exterior of the fixing portion 4121 of the base 412, and the outer sidewall of the connection portion 4132 is abutted against the inner sidewall of the housing 21.

The top cover 413 is connected to the base 412, and a space between the inner sidewall of the cover body portion 4131 of the top cover 413 and the inner sidewall of the stopping portion 4122 of the base 412 forms a mounting space in which the heat insulation member 24 and the light effect lens 23 are provided. The light effect lens 23 is provided close to the cover body portion 4131, and the heat insulation member 24 is provided close to the stopping portion 4122. The stopping portion 4122 can be configured to stop the heat insulation member 24, preventing the heat insulation member 24 from being detached from the accessory shell 41.

In this embodiment, the light effect lens 23 includes a Fresnel lens 231 and a diffusion sheet 232. The diffusion sheet 232 closes the opening 211 of the housing 21. An outer peripheral side of the diffusion sheet 232 is abutted against an inner sidewall of the connection portion 4132 in the top cover 413, and the cover body portion 4131 forms a blocking on the peripheral side of the diffusion sheet 232 to prevent the diffusion sheet 232 from being detached from the accessory shell 41.

The Fresnel lens 231 is provided on a side of the diffusion sheet 232 facing the light source 22, and the Fresnel lens 231 is directly opposite to the light source 22. The Fresnel lens 231 cooperates with the diffusion sheet 232 to realize the diffusion of light from the light source 22.

The heat insulation member 24 is provided on a side of the Fresnel lens 231 facing the light source 22, and the heat insulation member 24 is transparent, to ensure that the light from the light source 22 can smoothly pass through the heat insulation member 24 and be emitted to the light effect lens 23. The heat insulation member 24 is made of heat insulation material, such as heat insulation glass.

When the lamp 100 for photography and video works, the heat from the light source 22 reaches the heat insulation member 24, the heat insulation member 24 can rapidly absorb the heat and make the heat to be uniformly dispersed in the heat insulation member 24 to avoid overheat of a local region of the heat insulation member 24. The heat emitted by the light source 22 is blocked by the heat insulation member 24 and uniformly dispersed to the outside, and a part of the heat can be conducted to the outside world through the housing 21 and other components of the lamp 100 for photography and video, thereby effectively preventing the heat from accumulation on the light effect lens 23 and avoiding the heat damage to the light effect lens 23 caused by overheat of a local region of the light effect lens 23.

The heat insulation member 24 can insulate the heat generated by the light source 22 on the side of the light effect accessory 40 close to the light source 22, avoiding or reducing the heat melting damage to the light effect lens 23 caused by the contact of the high temperature heat and the light effect lens 23, to provide a comprehensive and direct protection for the light effect lens 23, so that the heat insulation member 24, on the side of the light effect lens 23 facing the light source 22, can directly insulate the high temperature heat, thereby effectively ensuring the structural stability of the lamp 100 for photography and video and the user's experience.

In some examples of this embodiment, a plurality of the heat insulation member 24 may be provided, and the plurality of heat insulation members 24 form multiple protections on the side of the light effect accessory 40 close to the light source 22 to effectively improve the heat insulation effect of the heat insulation member 24 between the light source 22 and the light effect lens 23.

In this embodiment, the light effect accessory 40 further includes a silicone ring 204, the shape of the silicone ring 204 is adapted to the outer contour of the heat insulation member 24, the silicone ring 204 is provided on the outer periphery of the heat insulation member 24, which are jointly provided in the inside of the accessory shell 41. The outer peripheral sidewall of the silicone ring 204 is abutted against the inner sidewall of the fixing portion 4121 in the base 412, and the stopping portion 4122 forms a blocking at the peripheral edge of the silicone ring 204 to prevent the accessory shell 41 connected to the silicone ring 204 from being detached from the accessory shell 41.

The outer periphery of the silicone ring 204 is abutted against the inner sidewall of the accessory shell 41, and the accessory shell 41 is abutted against the inner sidewall of the housing 21. Then, through the silicone ring 204 and the accessory shell 41, the heat insulation member 24 can transfer high temperature heat to the housing 21. In this embodiment, the accessory shell 41 and the housing 21 can be made of metal to better transfer heat for heat dissipation.

When the lamp 100 for photography and video of this embodiment is in use, the light effect accessory 40 as a whole is provided at the opening 211 of the housing 21. When the lamp 100 for photography and video works, the light emitted from the light source 22 passes through the heat insulation member 24, the Fresnel lens 231, and the diffusion sheet 232 in turn, and then emits out of the housing 21. The high temperature heat emitted by the light source 22 can be blocked on the side of the light effect accessory 40 facing the light source 22 by the heat insulation member 24, thereby avoiding the high temperature heat from overflowing to the Fresnel lens 231 and the diffusion sheet 232, preventing the Fresnel lens 231 and the diffusion sheet 232 from heat melting damage, and ensuring that the light effect lens 23 can be used normally.

Figure 21:
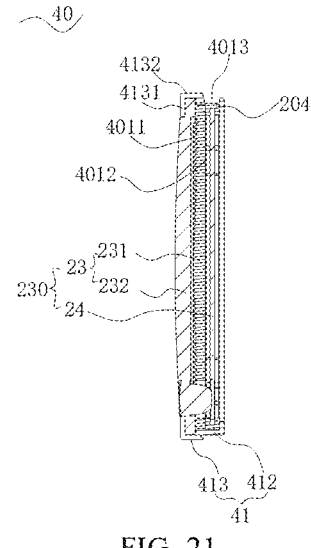
FIG. 21 is a structural view of an embodiment of the light effect accessory in the present application.
Figure 22:
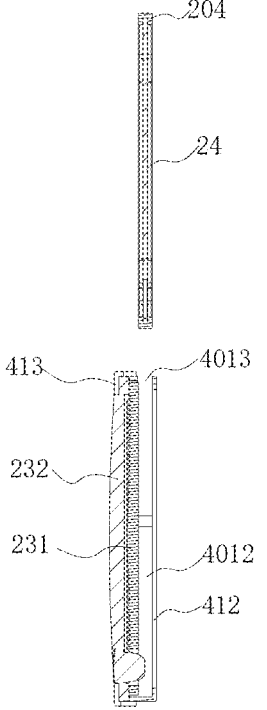
FIG. 22 is an exploded view of the light effect accessory shown in FIG. 21.
Figure 23:
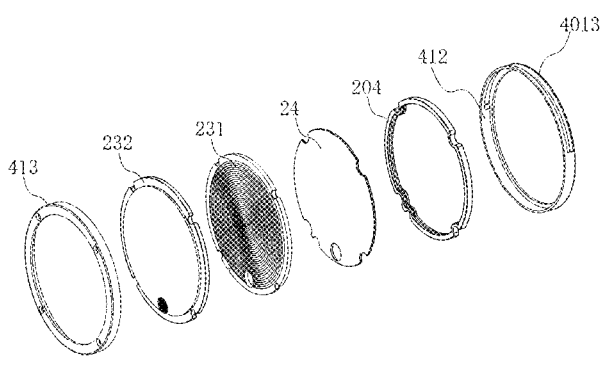
FIG. 23 is another exploded view of the light effect accessory shown in FIG. 21.

Referring to FIGS. 21 to 23, an embodiment of the present application provides a light effect accessory 40, which is provided at an opening 211 of the housing 21 of the lamp 100 for photography and video, and is opposite to the light source 22 inside the housing 21 of the lamp 100 for photography and video, and the light effect accessory 40 includes an accessory shell 41 and an accessory unit 230.

The inside of the accessory shell 41 is provided with a mounting region 4011 and a socket region 4012 separated from each other, and an end of the accessory shell 41 is provided with a socket interface 4013 in communication with the socket region 4012. The accessory unit 230 includes a light effect lens 23 and a heat insulation member 24, the light effect lens 23 is provided in the mounting region 4011, and the heat insulation member 24 is detachably socketed into the socket region 4012 via the socket interface 4013. The light effect lens 23 can be on the same optical axis as the light source 22. The heat insulation member 24 is transparent, and provided on the side of the light effect lens 23 facing the light source 22 for blocking the heat emitted from the light source 22 to the light effect lens 23.

In this embodiment, the accessory shell 41 includes a base 412 and a top cover 413 connected to a side of the base 412, both the top cover 413 and the base 412 are circular. The top cover 413 includes a cover body portion 4131 and an connection portion 4132, the connection portion 4132 is bent and connected to a peripheral edge of the cover body portion 4131.

A socket region 4012 of the accessory shell 41 is provided in the inside of the base 412, and a socket interface 4013 is provided on a sidewall of the base 412. The heat insulation member 24 can be socketed in the socket region 4012 of the accessory shell 41 via the socket interface 4013. A connection portion 4132 of the top cover 413 is sleeved on an outer peripheral side of the base 412, the connection portion 4132 is in partial contact with the outer peripheral sidewall of the base 412 and does not interfere with the socket interface 4013 on the sidewall of the base 412. The inside of the top cover 413 and the portion of the connection portion 4132 that corresponds to the inside of the base 412 form a mounting region 4011 of the accessory shell 41.

In this embodiment, the light effect lens 23 is provided in the mounting region 4011 of the accessory shell 41, and the heat insulation member 24 is detachably socketed in the socket region 4012 of the accessory shell 41. The light effect lens 23 of this embodiment includes a Fresnel lens 231 and a diffusion sheet 232. When the light effect accessory 40 is provided at the opening 211 of the housing 21 of the lamp 100 for photography and video, the diffusion sheet 232 is configured to close the opening 211 of the housing 21. An outer peripheral side of the diffusion sheet 232 is abutted against an inner sidewall of the connection portion 4132 in the top cover 413, and the cover body portion 4131 forms a blocking at the peripheral edge of the diffusion sheet 232 to prevent the diffusion sheet 232 from being detached from the accessory shell 41.

The Fresnel lens 231 is provided in the portion of the connection portion 4132 in the top cover 413 that corresponds to the inside of the base 412, and the Fresnel lens 231 is provided on the side of the diffusion sheet 232 facing the light source 22. The Fresnel lens 231 is directly opposite to the light source 22 of the lamp 100 for photography and video, and cooperates with the diffusion sheet 232 to realize the diffusion of light from the light source 22.

The heat insulation member 24 is provided on the side of the Fresnel lens 231 facing the light source 22, and the heat insulation member 24 is transparent, to ensure that the light from the light source 22 can pass through the heat insulation member 24 and be emitted to the light effect lens 23. The heat insulation member 24 is made of heat insulation material, such as a heat insulation glass.

When the lamp 100 for photography and video is in use, the heat emitted by the light source 22 of the lamp 100 for photography and video reaches the heat insulation member 24, the heat insulation member 24 can absorb the heat quickly and make the heat uniformly dispersed in the heat insulation member 24, to avoid overheat of a local region of the heat insulation member 24. The heat emitted by the light source 22 is blocked by the heat insulation member 24 and uniformly dispersed to outside, and a part of the heat can be conducted to the outside world through the housing 21 and other components of the lamp 100 for photography and video, thereby effectively preventing the heat from accumulation on the light effect lens 23 and avoiding heat damage to the light effect lens 23 caused by overheat of a local region of the light effect lens 23.

The heat insulation member 24 can insulate the heat generated by the light source 22 on the side of the light effect accessory 40 close to the light source 22, thereby preventing the high temperature heat from overflowing to the mounting region 4011 of the accessory shell 41, to avoid or reduce the heat melting damage to the light effect lens 23 caused by the contact of the high temperature heat and the light effect lens 23, and thus provide a comprehensive and direct protection for the light effect lens 23, so that the heat insulation member 24, on a side of the light effect lens 23 facing the light source 22, insulates the high temperature heat, thereby effectively ensuring the structural stability of the lamp 100 for photography and video and the user's experience.

In some examples of this embodiment, a plurality of the heat insulation member 24 may be provided, and the plurality of heat insulation members 24 form multiple protections on the side of the light effect accessory 40 close to the light source 22, avoiding as much as possible the overflow of high temperature heat to the mounting region 4011 of the accessory shell 41, to effectively improve the heat insulation effect of the heat insulation member 24 between the light source 22 and the light effect lens 23.

In this embodiment, the light effect accessory 40 also includes a silicone ring 204, the shape of the silicone ring 204 is adapted to the outer contour of the heat insulation member 24, the silicone ring 204 is provided on the outer periphery of the heat insulation member 24, which are jointly provided in the inside of the accessory shell 41. The outer peripheral sidewall of the silicone ring 204 is abutted against the inner sidewall of the fixing portion 4121 in the base 412, and the stopping portion 4122 forms a blocking at the peripheral side of the silicone ring 204 to prevent the heat insulation member 24 connected to the silicone ring 204 from being detached from the accessory shell 41.

The outer periphery of the silicone ring 204 is abutted against the inner sidewall of the accessory shell 41, and the accessory shell 41 is abutted against the inner sidewall of the housing 21. Then, through the silicone ring 204 and the accessory shell 41, the heat insulation member 24 can transfer the high temperature heat to the housing 21. In this embodiment, the accessory shell 41 and the housing 21 can be made of metal to better transfer the heat for heat dissipation.

In this embodiment, the heat insulation member 24 and the silicone ring 204 are jointly provided in the socket region 4012 of the accessory shell 41, the heat insulation member 24 and the silicone ring 204 as a whole can be socketed in the socket region 4012 of the accessory shell 41 via the socket 4013. The heat insulation member 24 and the silicone ring 204 as a whole are detachably provided, which can simplify the installation of the heat insulation member 24 and the silicone ring 204 in the accessory shell 41, facilitate the maintenance and replacement of the heat insulation member 24 and the silicone ring 204, and help to prolong the service life of the light effect accessory 40.

In addition, for the light effect accessory 40 of this embodiment, in addition to being socketed with the heat insulation member 24 and the silicone ring 204, the socket region 4012 of the accessory shell 41 can be replaced or added with other functional lenses according to the needs of the use, to increase the light effect function of the light effect accessory 40, and to expand the scope of the use of the lamp 100 for photography and video.

Figure 24:
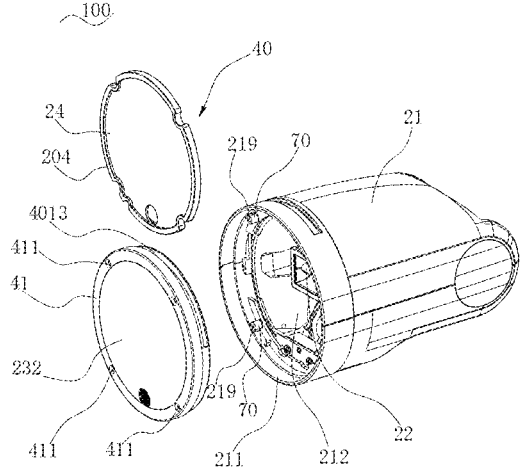
FIG. 24 is a structural view of an embodiment of the lamp for photography and video of the present application.
Figure 25:
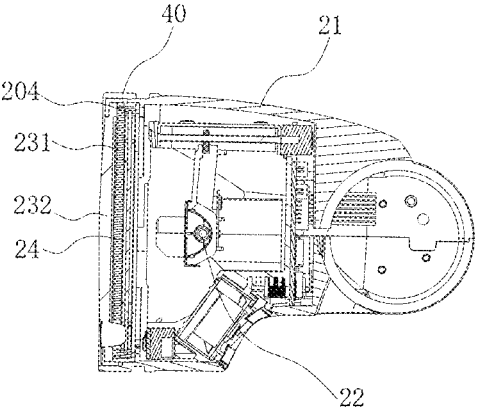
FIG. 25 is an exploded view of the lamp for photography and video shown in FIG. 24.

Referring to FIGS. 24 and 25, an embodiment of the present application also provides a lamp 100 for photography and video, which includes a housing 21, a light source 22, and a light effect accessory 40 as described above, and the structure of the light effect accessory 40 is as described above, which will not be repeated herein. The lamp 100 for photography and video of this embodiment may be a flash light, a photographic fill light, a stage lighting light, a live broadcasting light, etc.

Specifically, the inside of the housing 21 is provided with an accommodation cavity 212, and an end of the housing 21 is provided with an opening 211 in communication with the accommodation cavity 212. A light source 22 is provided in the accommodation cavity 212 of the housing 21, and the light source 22 may include a flash lamp and a COB lamp. A light effect accessory 40 is detachably provided at the opening 211 of the housing 21, and a light effect lens 23 in the light effect accessory 40 is on the same optical axis as the light source 22. The heat insulation member 24 of the light effect accessory 40 is transparent, and provided on the side of the light effect lens 23 facing the light source 22 for blocking the heat emitted from the light source 22 to the light effect lens 23.

In this embodiment, the light effect accessory 40 may be detachably connected to the opening 211 of the housing 21 by fasteners (not shown in the figure). Specifically, the accessory shell 41 is provided with mounting holes 411. A plurality of the mounting holes 411 may be provided, and the plurality of mounting holes 411 are spaced apart on the accessory shell 41.

The lamp 100 for photography and video further includes a connection post 70, the connection post 70 is provided on an inner sidewall of the housing 21 at the opening 211. The connection post 70 is extended along an axis of the housing 21, and a connection hole 219 is formed on an end face of the connection post 70 facing the opening 211 of the housing 21. A plurality of the connection posts 70 may be provided, the plurality of connection posts 70 are spaced apart on the inner sidewall of the housing 21.

When the light effect accessory 40 is placed at the opening 211 of the housing 21, the mounting holes 411 on the light effect accessory 40 correspond one-in-one with the connection holes 219 of the connection posts 70. A fastener is passed through the mounting holes 411 and the connection holes 219, such that the light effect accessory 40 is detachably fixed to the opening 211 of the housing 21. The fastener may be a screw or a pin, etc., which is not overly limited herein.

In other examples of this embodiment, detachable connection of the light effect accessory 40 and the housing 21 can be realized by magnetic fixation. The light effect accessory 40 further includes a magnetic suction member, the magnetic suction member is provided on the accessory shell 41. A plurality of magnetic suction members may be provided, the plurality of magnetic suction members are spaced apart on the accessory shell 41.

The example lamp 100 for photography and video further includes a magnetic member, the magnetic member is provided on an inner sidewall of the housing 21 at the opening 211. A plurality of the magnetic member may be provided, the plurality of magnetic members are spaced apart on the inner sidewall of the housing 21. The magnetic member is a columnar structure, whose extension direction is coincident with the axis of the housing 21, and an outer end surface of the magnetic member is provided toward the opening 211 of the housing 21.

When the lamp 100 for photography and video of this embodiment is in use, the heat insulation member 24 together with the silicone ring 204 is socketed in the socket region 4012 of the accessory shell 41, and the light effect accessory 40 as a whole is provided at the opening 211 of the housing 21. When the lamp 100 for photography and video works, the light emitted from the light source 22 passes through the heat insulation member 24, the Fresnel lens 231, and the diffusion sheet 232 in turn, and then emits out of the housing 21. The high temperature heat emitted by the light source 22 can be blocked on the side of the light effect accessory 40 facing the light source 22 by the heat insulation member 24, thereby preventing the high temperature heat from overflowing to the mounting region 4011 of the accessory shell 41, and preventing the high temperature heat from affecting the Fresnel lens 231 and the diffusion sheet 232, thereby effectively preventing heat melting damage to the Fresnel lens 231 and the diffusion sheet 232, and ensuring that the light effect lens 23 can be used normally.

Figure 26:
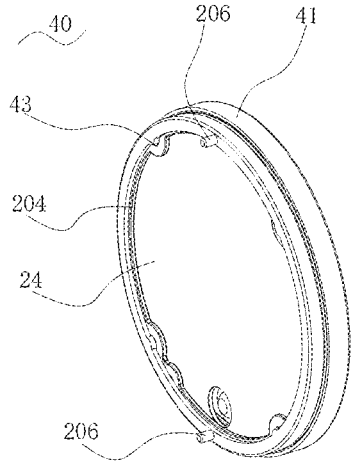
FIG. 26 is a structural view of an embodiment of the light effect accessory of the present application.
Figure 27:
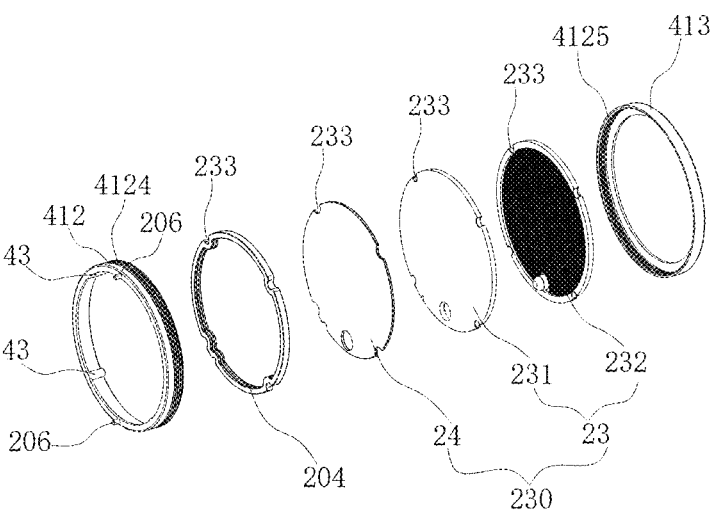
FIG. 27 is an exploded view of the light effect accessory shown in FIG. 26.
Figure 28:
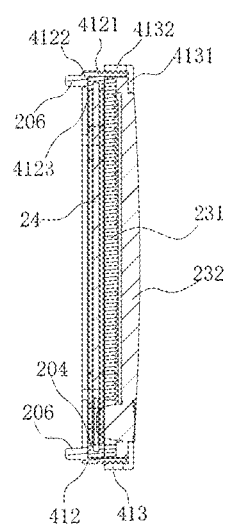
FIG. 28 is a sectional view of the light effect accessory shown in FIG. 26.

Referring to FIGS. 26 to 28, an embodiment of the present application provides a light effect accessory 40, which can be assembled on the housing 21 of the lamp 100 for photography and video, and the light effect accessory 40 is opposite to the light source 22 of the lamp 100 for photography and video. The light effect accessory 40 includes an accessory shell 41 and an accessory unit 230.

The accessory shell 41 includes a base 412 and a top cover 413 detachably provided on the base 412, and an assembly region 4123 is formed between the top cover 413 and the base 412. The accessory unit 230 includes a light effect lens 23 and a heat insulation member 24. The light effect lens 23 and the heat insulation member 24 are provided in the assembly region 4123, and both can be in the same optical axis as the light source 22. The heat insulation member 24 is transparent, and provided on a side of the light effect lens 23 facing the light source 22 for blocking heat emitted from the light source 22 to the light effect lens 23.

In this embodiment, the top cover 413 includes a cover body portion 4131 and a connection portion 4132, and the connection portion 4132 is bent and connected to a peripheral edge of the cover body portion 4131. The base 412 includes a fixing portion 4121 and a stopping portion 4122, the stopping portion 4122 is bent and connected to the peripheral edge of the fixing portion 4121. The connection portion 4132 of the top cover 413 is detachably sleeved on and fixed to the exterior of the fixing portion 4121 of the base 412, and an assembly region 4123 of the accessory shell 41 is formed between the cover body portion 4131 and the stopping portion 4122.

In this embodiment, an outer peripheral sidewall of the fixing portion 4121 is provided with external threads 4124, and an inner peripheral sidewall of the connection portion 4132 is provided with internal threads 4125. The external threads 4124 are screwed with the internal threads 4125 to make the top cover 413 to be screwed and fixed to the base 412. When it is necessary to open the top cover 413 and the base 412, it is sufficient to release screwing fixation of the top cover 413 and the base 412.

Through the detachable connection of the top cover 413 and the base 412, the user can replace the light effect lens 23 and the heat insulation member 24 according to his or her own needs. Simultaneously, when the light effect unit is damaged or when different light effects need to be realized, the light effect lens 23, the heat insulation member 24, and the light effect lens can be maintained and replaced correspondingly, to improve the flexibility of the application of the light effect accessory 40.

In some examples of this embodiment, the top cover 413 may also be detachably connected to the base 412 by other means, such as the connection portion 4132 of the top cover 413 is snap-fixed to the fixing portion 4121 of the base 412, or the connection portion 4132 of the top cover 413 is magnetically fixed to the fixing portion 4121 of the base 412.

In this embodiment, the light effect lens 23 includes a Fresnel lens 231 and a diffusion sheet 232. The diffusion sheet 232 is configured to close the opening 211 of the housing 21, and the Fresnel lens 231 is provided on the side of the diffusion sheet 232 facing the light source 22. The Fresnel lens 231 is directly opposite to the light source 22 of the lamp 100 for photography and video, and cooperates with the diffusion sheet 232 to realize the diffusion of light from the light source 22.

The heat insulation member 24 is provided on the side of the Fresnel lens 231 facing the light source 22, and the heat insulation member 24 is made of heat insulation material, such as a heat insulation glass. When the heat emitted by the light source 22 reaches the heat insulation member 24, the heat insulation member 24 can rapidly absorb the heat and make the heat uniformly dispersed in the heat insulation member 24 to avoid overheat of a local region of the heat insulation member 24. Because the heat emitted by the light source 22 is blocked by the heat insulation member 24 and uniformly emitted to outside, a part of the heat can be conducted to the outside world through the housing of the lamp and other components, thereby effectively preventing heat damage to the light effect lens 23 caused by overheat of a local region of the light effect lens 23.

The light effect accessory 40 further includes a silicone ring 204, the shape of the silicone ring 204 is adapted to the outer contour of the heat insulation member 24, the silicone ring 204 is sleeved on the outer periphery of the heat insulation member 24, which are provided together inside the accessory shell 41. An outer peripheral sidewall of the silicone ring 204 is abutted against the inner sidewall of the accessory shell 41.

The outer periphery of the silicone ring 204 is abutted against the inner sidewall of the accessory shell 41, and the heat insulation member 24 can transfer the high temperature heat to the accessory shell 41 through the silicone ring 204.

In this embodiment, the accessory shell 41 can be made of a metal material or a metal conductive member can be formed between the accessory shell 41 and the silicone ring 204, to better transfer the heat for heat dissipation.

In this embodiment, the heat insulation member 24 is provided in the accessory shell 41 together with the silicone ring 204. Through the detachable connection of the top cover 413 and the base 412, the heat insulation member 24 and the silicone ring 204 can be taken out simultaneously, which facilitates the maintenance and replacement of the heat insulation member 24 and the silicone ring 204, and contributes to the service life of the light effect accessory 40.

In this embodiment, the accessory shell 41 includes an assembly post 43, which is protruded on the inner sidewall of the base 412. The outer peripheral edge of the heat insulation member 24, the outer peripheral edge of the Fresnel lens 231, and the outer peripheral edge of the diffuser sheet 232 are provided with assembly openings 233 that are snapped to the assembly post 43.

When the outer peripheral contour of the silicone ring 204 is adapted to the shape of the heat insulation member 24, the outer peripheral sidewalls of the silicone ring 204 are concave to form the assembly opening 233. The assembly opening 233 is snap-fit with the assembly post 43 to fix the heat insulation member 24, together with the silicone ring 204, the Fresnel lens 231, and the diffusion sheet 232, in the assembly region 4123 of the accessory shell 41.

When the heat insulation member 24 together with the silicone ring 204, the Fresnel lens 231, and the diffusion sheet 232 are fixed in the assembly region 4123 of the accessory shell 41, the stopping portion 4122 of the base 412 can form a blocking on sides of the heat insulation member 24 and the silicone ring 204, preventing the heat insulation member 24 and the silicone ring 204 from being detached from the accessory shell 41, and the cover body portion 4131 of the top cover 413 can form a blocking on a side of the diffusion sheet 232 to avoid the diffusion sheet 232 from being detached from the accessory shell 41, to ensure the stability of the overall structure of the light effect accessory 40.

Figure 29:
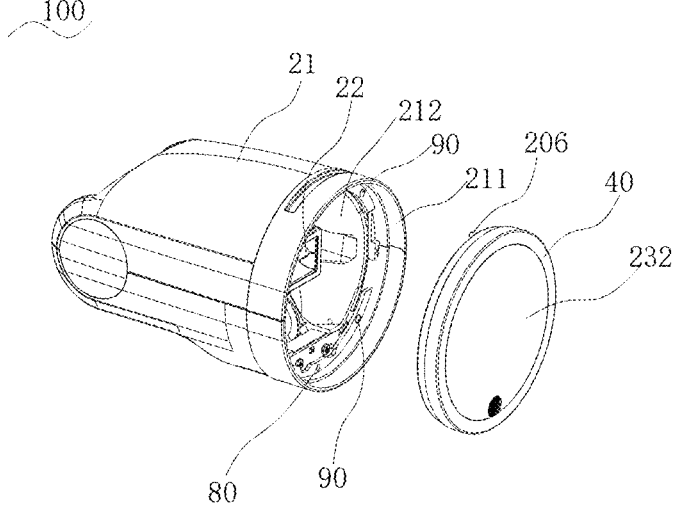
FIG. 29 is a structural view of an embodiment of the lamp for photography and video of the present application.
Figure 30:
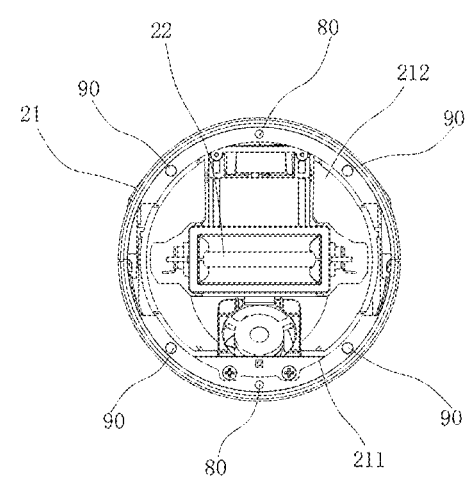
FIG. 30 is an internal structural view of the housing in the lamp for photography and video shown in FIG. 26.

Referring to FIGS. 29 and 30, an embodiment of the present application also provides a lamp 100 for photography and video, which includes a housing 21, a light source 22, and a light effect accessory 40 as described above, and the structure of the light effect accessory 40 is as described above and will not be repeated herein. The lamp 100 for photography and video of this embodiment may be a flash light, a photography fill light, a stage lighting light, a live broadcasting light, etc.

Specifically, the inside of the housing 21 is provided with an accommodation cavity 212, and an end of the housing 21 is provided with an opening 211 in communication with the accommodation cavity 212. The light source 22 is provided in the accommodation cavity 212 of the housing 21, and the light source 22 may include a flash lamp and a COB lamp. A light effect accessory 40 is detachably provided at the opening 211 of the housing 21, and a light effect lens 23 in the light effect accessory 40 is on the same optical axis as the light source 22. The heat insulation member 24 of the light effect accessory 40 is transparent, and provided on a side of the light effect lens 23 facing the light source 22 for blocking the heat emitted from the light source 22 to the light effect lens 23.

In this embodiment, the accessory shell 41 is made of a metallic material. The lamp 100 for photography and video further includes a magnetic member 90, which may be a magnet. The magnetic member 90 is provided on an inner sidewall of the housing 21 at the opening 211, and the accessory shell 41 is magnetically fixed to the magnetic member 90 to make the light effect accessory 40 as a whole to be detachably provided at the opening 211 of the housing 21.

A plurality of the magnetic members 90 may be provided, the plurality of magnetic members 90 are spaced apart on the inner sidewall of the housing 21 at the opening 211. The plurality of magnetic members 90 act simultaneously with the accessory shell 41 to improve the stability of the connection of the light effect accessory 40 and the housing 21.

The light effect accessory 40 of this embodiment further includes a positioning post 206, the positioning post 206 is protruded on a side of the stopping portion 4122 of the base 412 in the accessory shell 41 towards the opening 211 of the housing 21. A positioning hole 80 is provided in the inner sidewall of the housing 21 close to the opening 211 along the axis of the housing 21, and the positioning post 206 is passed through the positioning hole 80 to locate and fix the light effect accessory 40 on the housing 21, thereby improving the assembly precision of the light effect accessory 40 on the housing 21.

When the lamp 100 for photography and video of this embodiment is in use, the light effect accessory 40 is provided at the opening 211 of the housing 21, and the light emitted from the light source 22 passes through the heat insulation member 24, the Fresnel lens 231, and the diffusion sheet 232 in turn, and then emits out of the housing 21. The high temperature heat emitted by the light source 22 can be blocked on the side of the light effect accessory 40 facing the light source 22 by the heat insulation member 24, thereby preventing the high temperature heat from overflowing to the Fresnel lens 231 and the diffusion sheet 232, thereby effectively preventing heat melting damage to the Fresnel lens 231 and the diffusion sheet 232, and ensuring that the light effect lens 23 can be used normally.

For the lamp for photography and video of the present application, there is a heat insulation member between the light source and the light effect lens, and the heat insulation member can block the high temperature heat from the light source to the light effect lens, avoiding heat melting damage to the light effect lens caused by the high temperature, which can greatly increase the number of continuous flash light or continuous illumination time of the lamp for photography and video, improve the service life of the lamp for photography and video, and satisfy the requirements of the user for high speed continuous shooting or long time work, effectively improving the user's experience.

Although the present application has been described with reference to several exemplary embodiments, it should be understood that the terms used are illustrative and exemplary, and not limiting. Since the present application can be practiced in various forms without departing from the spirit or substance of the invention, it should be understood that the above embodiments are not limited to any of the foregoing details, but should be broadly construed within the spirit and scope defined by the accompanying claims, and therefore all variations and adaptations falling within the scope of the claims or their equivalents should be covered by the accompanying claims.

What is claimed is:

1. A lamp for photography and video, comprising a main body and a lamp head provided on the main body, wherein the lamp head comprises:

a housing, provided with an accommodation cavity inside, wherein an end of the housing is provided with an opening in communication with the accommodation cavity;

a light source, provided in the accommodation cavity of the housing;

a light effect lens, provided at the opening of the housing and on a same optical axis as the light source;

a transparent heat insulation member, provided between the light source and the light effect lens for blocking heat emitted from the light source to the light effect lens; and a silicone ring sleeved on an outside of the heat insulation member, wherein a shape of the silicone ring is adapted to an outer contour of the heat insulation member.

2. The lamp for photography and video according to claim 1, wherein the heat insulation member is configured to separate the accommodation cavity of the housing into a first accommodation region and a second accommodation region;

wherein the light source is provided in the first accommodation region, the light effect lens is provided in the second accommodation region, and the heat insulation member is configured to block the heat in the first accommodation region from entering into the second accommodation region.

3. The lamp for photography and video according to claim 2, wherein the heat insulation member is provided at the opening of the housing and provided on a side of the light effect lens facing the light source; and a side of the accommodation cavity where the heat insulation member faces the light source forms the first accommodation region, and a side of the accommodation cavity where the heat insulation member faces the light effect lens forms the second accommodation region.

4. The lamp for photography and video according to claim 1, wherein a sidewall of the housing is provided with a socket in communication with the accommodation cavity, and the heat insulation member is socketed in the accommodation cavity via the socket; and the heat insulation member is provided between the light source and the light effect lens for blocking the heat emitted from the light source to the light effect lens.

5. The lamp for photography and video according to claim 4, further comprising a cover body, wherein the cover body is configured to open or cover the socket;

wherein the cover body comprises a cover main body and an adapter portion provided on the cover main body, and the housing is provided with a connection groove close to the socket; and the adapter portion is snapped into the connection groove to make the cover body to close the socket.

6. The lamp for photography and video according to claim 4, further comprising a cover body rotatably connected at the socket of the housing to be close to the socket so as to cover the socket or to be away from the socket so as to open the socket.

7. The lamp for photography and video according to claim 1, wherein the heat insulation member is a heat insulation glass, and the light effect lens comprises a Fresnel lens and a diffuser.

8. A lamp for photography and video, comprising a main body and a lamp head provided on the main body, wherein the lamp head comprises:

a housing, provided with an accommodation cavity inside, wherein an end of the housing is provided with an opening in communication with the accommodation cavity;

a light source, provided in the accommodation cavity of the housing;

a light effect accessory, detachably provided at the opening of the housing, wherein the light effect accessory comprises an accessory shell, and a light effect lens and a heat insulation member provided inside the accessory shell; and a silicone ring sleeved on an outside of the heat insulation member, wherein a shape of the silicone ring is adapted to an outer contour of the heat insulation member;

wherein the light effect lens and the heat insulation member are able to be on a same optical axis as the light source, and the heat insulation member is provided on a side of the light effect lens facing the light source for blocking heat emitted from the light source to the light effect lens;

wherein an inside of the accessory shell is provided with a mounting region and a socket region separated from each other, and an end of the accessory shell is provided with a socket interface in communication with the socket region;

wherein the light effect lens is provided in the mounting region, and the heat insulation member is detachably socketed in the socket region via the socket interface.

9. The lamp for photography and video according to claim 8, wherein the light effect accessory further comprises a light effect magnetic suction member provided on the accessory shell;

wherein the lamp for photography and video further comprises a light effect magnetic member provided on an inner sidewall of the housing at the opening, and the light effect magnetic suction member is magnetically fixed to the light effect magnetic member to make the light effect accessory to be detachably provided at the opening of the housing.

10. The lamp for photography and video according to claim 8, wherein an inside of the accessory shell is provided with a mounting region and a socket region separated from each other, and an end of the accessory shell is provided with a socket interface in communication with the socket region;

wherein the light effect lens is provided in the mounting region, and the heat insulation member is detachably socketed in the socket region via the socket interface.

11. The lamp for photography and video according to claim 10, wherein the accessory shell comprises a base and a top cover connected to a side of the base, and the base and the top cover are circular;

wherein the top cover is sleeved on an outside of the base and the socket region is provided in an inside of the base, and the socket interface is opened on a sidewall of the base;

wherein the top cover comprises a cover body portion and a connection portion bent and connected to a peripheral edge of the cover body portion, and the connection portion is sleeved on the outside of the base; and wherein an inside of the top cover and a portion of the connection portion corresponding to the inside of the base form the mounting region.

12. The lamp for photography and video according to claim 8, wherein the accessory shell comprises a base and a top cover detachably provided on the base, and the top cover and the base form an assembly region, and the light effect lens and the heat insulation member are provided in the assembly region.

13. The lamp for photography and video according to claim 12, wherein the top cover and the base are circular, the top cover comprises a cover body portion and a connection portion bent and connected to a peripheral edge of the cover body portion;

wherein the base comprises a fixing portion and a stopping portion bent and connected to a peripheral edge of the fixing portion, and the connection portion is detachably sleeved on an outer periphery of the fixing portion, and the cover body portion and the stopping portion form the assembly region;

wherein an outer peripheral sidewall of the fixing portion is provided with an external thread, an inner peripheral sidewall of the connection portion is provided with an internal thread, and the external thread is screwed to the internal thread to make the top cover to be detachably connected to the base.

14. The lamp for photography and video according to claim 12, wherein the top cover and the base are circular, and the top cover comprises a cover body portion and a connection portion bent and connected to a peripheral edge of the cover body portion;

wherein the base comprises a fixing portion and a stopping portion bent and connected to a peripheral edge of the fixing portion;

wherein the connection portion is detachably sleeved on an outer periphery of the fixing portion, and the cover body portion and the stopping portion form the assembly region; and the connection portion is snap-fixed or magnetically fixed to the outer periphery of the fixing portion.

15. The lamp for photography and video according to claim 9, wherein a plurality of light effect magnetic members are spaced apart on the inner sidewall of the housing at the opening.

16. The lamp for photography and video according to claim 13, wherein the light effect accessory further comprises a positioning post protruded on a side of the stopping portion of the base in the accessory shell towards the opening of the housing; and a positioning hole is provided in an inner sidewall of the housing close to the opening along an axis of the housing, and the positioning post is passed through the positioning hole to locate and fix the light effect accessory on the housing.

17. The lamp for photography and video according to claim 8, wherein the accessory shell is made of a metallic material.

18. The lamp for photography and video according to claim 9, wherein the light effect magnetic member is a magnet.

* * * * *